United States Patent
Yoon

(10) Patent No.: US 11,624,661 B2
(45) Date of Patent: Apr. 11, 2023

(54) SELF-REFERENCED AMBIENT RADIATION THERMOMETER AND PROCESS FOR DETERMINING A TEMPERATURE OF A BLACKBODY OBJECT

(71) Applicant: Government of the United States of America, as represented by the Secretary of Commerce, Gaithersburg, MD (US)

(72) Inventor: Howard Wuk Yoon, North Potomac, MD (US)

(73) Assignee: GOVERNMENT OF THE UNITED STATES OF AMERICA, AS REPRESENTED BY THE SECRETARY OF COMMERCE, Gaithersburg, MD (US)

( * ) Notice: Subject to any disclaimer, the term of this patent is extended or adjusted under 35 U.S.C. 154(b) by 514 days.

(21) Appl. No.: 16/830,393

(22) Filed: Mar. 26, 2020

(65) Prior Publication Data
US 2020/0309604 A1   Oct. 1, 2020

Related U.S. Application Data

(60) Provisional application No. 62/825,174, filed on Mar. 28, 2019.

(51) Int. Cl.
*G01J 5/53*    (2022.01)
*G01J 5/0806*  (2022.01)
(Continued)

(52) U.S. Cl.
CPC .............. *G01J 5/53* (2022.01); *G01J 5/0804* (2022.01); *G01J 5/0806* (2013.01); *G01J 5/10* (2013.01)

(58) Field of Classification Search
CPC .......... G01J 5/53; G01J 5/0804; G01J 5/0806; G01J 5/10; G01J 5/061; G01J 5/0856; G01J 5/34
See application file for complete search history.

(56) References Cited

U.S. PATENT DOCUMENTS 8,119,987 B2 * 2/2012 Yoon ..................... G01J 5/0806
250/339.01

* cited by examiner

*Primary Examiner* — David P Porta
*Assistant Examiner* — Gisselle M Gutierrez
(74) *Attorney, Agent, or Firm* — Office of Chief Counsel for National Institute of Standards and Technology

(57) ABSTRACT

A self-referenced ambient radiation thermometer determines a temperature of a blackbody object and includes a temperature stabilized detector; a detector lens; a Lyot stop; a collimating lens; a field stop; an optical chopper such that the central radiation received by the temperature stabilized detector is modulated at a modulation frequency of the optical chopper; an objective lens in optical communication with the blackbody object and the temperature stabilized detector, optically interposed between the blackbody object and the field stop and that: receives the central radiation from the blackbody object and communicates the central radiation to the field stop; and a temperature-stabilized isothermal enclosure that provides a stable temperature and isothermal environment to elements disposed in the temperature-stabilized isothermal enclosure, wherein the elements disposed in the temperature-stabilized isothermal enclosure comprise: the temperature stabilized detector, the detector lens, the collimating lens, the Lyot stop, and the field stop.

17 Claims, 18 Drawing Sheets

(51) Int. Cl.
*G01J 5/10* (2006.01)
*G01J 5/0804* (2022.01)

| | |
|---|---|
| Object Distance | 40 cm |
| Image Distance | 25 cm |
| Objective Focal Length and Diameter | 15 cm, 5 cm |
| Lens Material | ZnSe |
| Field Stop Diameter | 6 mm |
| Target Diameter | 9.6 mm |
| F/# | 10 |
| Lyot Stop Diameter | 13 mm |
| Field Stop, Lyot Stop, Detector Temperature | 23 °C |
| Detector Type | pyroelectric |
| Feedback Resistor | 100 GΩ |
| Detector Diameter | 5 mm |
| Filter | 8 μm to 14 μm |
| Collimator Lens Focal Length and Diameter | 100 mm, 25.4 mm |
| Detector Lens Focal Length and Diameter | 50 mm, 25.4 mm |
| Image Diameter on Detector | 4 mm |

FIG. 4

| Time constant (s) | NEP (W) | (W Hz$^{-0.5}$) | D* (cm Hz$^{0.5}$/W) |
|---|---|---|---|
| 0.1 | 3.4E-10 | 3.8E-10 | 1.17E+09 |
| 0.3 | 1.8E-10 | 3.5E-10 | 1.27E+09 |
| 1 | 1E-10 | 3.7E-10 | 1.2E+09 |
| 3 | 5.4E-11 | 3.3E-10 | 1.34E+09 |

FIG. 6

| Wavelength (μm) | Strehl Ratio |
|---|---|
| 8 | 0.018 |
| 9 | 0.079 |
| 10 | 0.359 |
| 11 | 0.791 |
| 12 | 0.047 |
| 13 | 0.055 |
| 14 | 0.0035 |

FIG. 7

|   | Uncertainty Component at 30 °C | T, mK |
|---|---|---|
| 1 | SPRT Temperature | 3 |
| 2 | Emissivity | 4 |
| 3 | Residuals of fit | 5 |
| 4 | Noise | 3 |
|   | Combined Standard Uncertainties ($k=1$) | 7.7 |
|   | Combined Expanded Uncertainties ($k=2$) | 15 |

FIG. 18

SELF-REFERENCED AMBIENT RADIATION THERMOMETER AND PROCESS FOR DETERMINING A TEMPERATURE OF A BLACKBODY OBJECT

CROSS REFERENCE TO RELATED APPLICATIONS

The application claims priority to U.S. Provisional Patent Application Ser. No. 62/825,174 filed Mar. 28, 2019, the disclosures of which is incorporated herein by reference in its entirety.

STATEMENT REGARDING FEDERALLY SPONSORED RESEARCH

This invention was made with United States Government support from the National Institute of Standards and Technology (NIST), an agency of the United States Department of Commerce and under Agreement No. 1511-685-02 awarded by the United States Air Force and under Agreement No. R17-685-0008 awarded by the United States Army. The Government has certain rights in the invention. Licensing inquiries may be directed to the Technology Partnerships Office, NIST, Gaithersburg, Md., 99; voice (301)-975-2573; email tpo@nist.gov; reference Ser. No. 16/830,393.

BRIEF DESCRIPTION

Disclosed is a self-referenced ambient radiation thermometer for determining a temperature of a blackbody object, the self-referenced ambient radiation thermometer comprising: a temperature stabilized detector that receives central radiation from a blackbody object and produces a detector temperature signal in response to receipt of the central radiation; a detector lens in optical communication with the temperature stabilized detector and optically interposed between the temperature stabilized detector and the blackbody object and that receives the central radiation from the blackbody object and focuses the central radiation on the temperature stabilized detector; a Lyot stop in optical communication with the blackbody object and optically interposed between the detector lens and the blackbody object and that receives scattered radiation from a collimating lens, stops the scattered radiation from reaching the temperature stabilized detector, and communicates the central radiation to the detector lens; the collimating lens in optical communication with the temperature stabilized detector and optically interposed between the temperature stabilized detector and the blackbody object and that receives the central radiation from the blackbody object and collimates the central radiation to the detector lens; a field stop in optical communication with the collimating lens and interposed between the collimating lens and the blackbody object and that receives the central radiation and peripheral radiation from the blackbody object, stops the peripheral radiation from reaching the collimating lens, and communicates the central radiation to the collimating lens; an optical chopper in optical communication with the collimating lens and interposed between the collimating lens and the blackbody object and that receives the central radiation and peripheral radiation from the blackbody object, stops the peripheral radiation from reaching the collimating lens, modulates the central radiation, and communicates the central radiation to the collimating lens such that the central radiation received by the temperature stabilized detector is modulated at a modulation frequency of the optical chopper; an objective lens in optical communication with the blackbody object and the temperature stabilized detector, optically interposed between the blackbody object and the field stop and that: receives the central radiation from the blackbody object and communicates the central radiation to the field stop; and a temperature-stabilized isothermal enclosure that provides a stable temperature and isothermal environment to elements disposed in the temperature-stabilized isothermal enclosure, wherein the elements disposed in the temperature-stabilized isothermal enclosure comprise: the temperature stabilized detector, the detector lens, the collimating lens, the Lyot stop, and the field stop.

Disclosed is a process for determining a temperature of a blackbody object with the self-referenced ambient radiation thermometer of claim 1, the process comprising: providing, by the temperature-stabilized isothermal enclosure, the stable temperature and isothermal environment to elements disposed in the temperature-stabilized isothermal enclosure; producing central radiation in a central radiation region by the blackbody object; producing peripheral radiation in a peripheral portion by the blackbody object; receiving the central radiation and the peripheral radiation from the blackbody object by the objective lens; focusing the central radiation and the peripheral radiation to an objective lens image plane at the field stop; producing, from the central radiation, scattered radiation by the objective lens at an edge of the objective lens; focusing the scattered radiation to the objective lens image plane at the field stop by the objective lens; modulating the central radiation by the optical chopper so that the central radiation received by the temperature stabilized detector is modulated by the optical chopper; receiving the peripheral radiation by the field stop, blocking the peripheral radiation from further propagation in the temperature-stabilized isothermal enclosure toward the temperature stabilized detector by the field stop, and transmitting the central radiation and the scattered radiation to the collimating lens from the field stop; receiving the central radiation and the scattered radiation by the collimating lens from the field stop; collimating the central radiation and the scattered radiation by the collimating lens; receiving the central radiation and the scattered radiation from the collimating lens by the Lyot stop, blocking the scattered radiation from further propagation in the temperature-stabilized isothermal enclosure toward the temperature stabilized detector by the Lyot stop, and transmitting the central radiation in an absence of the scattered radiation to the detector lens from the Lyot stop; receiving the central radiation from the Lyot stop by the detector lens; focusing the central radiation to the temperature stabilized detector by the central radiation; receiving the temperature stabilized detector from the detector lens by the temperature stabilized detector; and producing the detector temperature signal by the temperature stabilized detector in response to receiving the central radiation from the detector lens to determine the temperature of a blackbody object.

BRIEF DESCRIPTION OF THE DRAWINGS

The following description cannot be considered limiting in any way. With reference to the accompanying drawings, like elements are numbered alike.

FIG. 4 shows a list of specifications for a self-referenced ambient radiation thermometer;

FIG. 6 shows a list of measurements of noise-equivalent power detectivity as a function of lock-in filter time constant. Detectivities are determined with a 5 mm diameter active detector area;

FIG. 7 shows a list of optical performance of the ZnSe objective lens as measured using a Strehl ratio. A Strehl ratio of unity indicates diffraction limited performance. Drop-off in performance in lower Strehl ratios is due to chromatic aberrations of a ZnSe lens;

FIG. 18 shows a list of estimated uncertainties of ART measured temperatures at 30° C.

DETAILED DESCRIPTION

Figure 1:
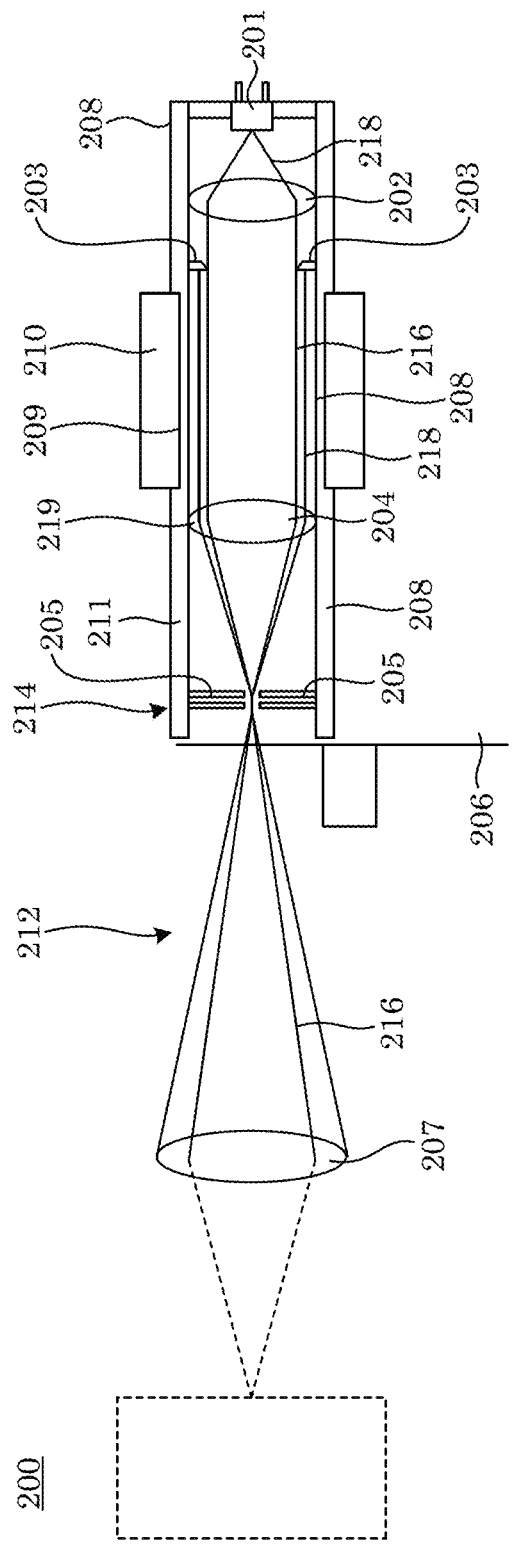
FIG. 1 shows a self-referenced ambient radiation thermometer.

A detailed description of one or more embodiments is presented herein by way of exemplification and not limitation.

It has been discovered that a self-referenced ambient radiation thermometer (ART) measures non-contact temperatures from −50° C. to 150° C. The self-referenced ambient radiation thermometer provides long-term stability of responsivity, wherein optical components within a field-of-view of detector and the detector are thermally stabilized in an optical assembly using independent thermo-electric control. The self-referenced ambient radiation thermometer can include lenses for collecting and focusing thermal-infrared radiation onto a pyroelectric detector. The pyroelectric detector has a window, e.g., with an 8 μm to 14 μm filter for selecting the thermal radiation. Advantageously, the detector and preamplifier are packaged into a hermetically sealed container, and incident radiation is modulated using a reflecting chopper wheel. Modulated signals are measured using a phase sensitive detector.

Self-referenced ambient radiation thermometer 200 determines a temperature of blackbody object 220. In an embodiment, with reference to FIG. 1, FIG. 2, and FIG. 3, self-referenced ambient radiation thermometer 200 includes: temperature stabilized detector 201 that receives central radiation 216 from blackbody object 220 and produces detector temperature signal 225 in response to receipt of central radiation 216; detector lens 202 in optical communication with temperature stabilized detector 201 and optically interposed between temperature stabilized detector 201 and blackbody object 220 and that receives central radiation 216 from blackbody object 220 and focuses central radiation 216 on temperature stabilized detector 201; Lyot stop 203 in optical communication with blackbody object 220 and optically interposed between detector lens 202 and blackbody object 220 and that receives scattered radiation 218 from collimating lens 204, stops scattered radiation 218 from reaching temperature stabilized detector 201, and communicates central radiation 216 to detector lens 202; collimating lens 204 in optical communication with temperature stabilized detector 201 and optically interposed between temperature stabilized detector 201 and blackbody object 220 and that receives central radiation 216 from blackbody object 220 and collimates central radiation 216 to detector lens 202; field stop 205 in optical communication with collimating lens 204 and interposed between collimating lens 204 and blackbody object 220 and that receives central radiation 216 and peripheral radiation 217 from blackbody object 220, stops peripheral radiation 217 from reaching collimating lens 204, and communicates central radiation 216 to collimating lens 204; optical chopper 206 in optical communication with collimating lens 204 and interposed between collimating lens 204 and blackbody object 220 and that receives central radiation 216 and peripheral radiation 217 from blackbody object 220, stops peripheral radiation 217 from reaching collimating lens 204, modulates central radiation 216, and communicates central radiation 216 to collimating lens 204 such that central radiation 216 received by temperature stabilized detector 201 is modulated at modulation frequency of optical chopper 206; objective lens 207 in optical communication with blackbody object 220 and temperature stabilized detector 201, optically interposed between blackbody object 220 and field stop 205 and that: receives central radiation 216 from blackbody object 220 and communicates central radiation 216 to field stop 205; and temperature-stabilized isothermal enclosure 208 that provides a stable temperature and isothermal environment to elements disposed in temperature-stabilized isothermal enclosure 208, wherein elements disposed in temperature-stabilized isothermal enclosure 208 include: temperature stabilized detector 201, detector lens 202, collimating lens 204, Lyot stop 203, and field stop 205.

Self-referenced ambient radiation thermometer 200 also can include blackbody object 220. It is contemplated that field stop 205 is disposed at objective lens image plane 214 of objective lens 207.

In an embodiment, self-referenced ambient radiation thermometer 200 includes temperature stabilizing thermal insulation 210 disposed on temperature-stabilized isothermal enclosure 208 to thermally insulate temperature-stabilized isothermal enclosure 208 and elements disposed in temperature-stabilized isothermal enclosure 208. It is contemplated that temperature-stabilized isothermal enclosure 208 includes temperature-stabilized isothermal entry enclosure 211 in which field stop 205 and collimating lens 204 are disposed; temperature-stabilized isothermal detector enclosure 232 in which Lyot stop 203 and detector lens 202 are disposed; temperature-stabilized isothermal transition region 209 that separates temperature stabilized detector 201 and Lyot stop 203 from field stop 205; and temperature-stabilized isothermal detector mount 233 on which temperature stabilized detector 201 is disposed.

Objective lens 207 includes edge 219 that receives central radiation 216 and produces scattered radiation 218 that is blocked by Lyot stop 203.

In an embodiment, self-referenced ambient radiation thermometer 200 includes: temperature controller 221 in communication with temperature-stabilized isothermal enclosure 208 and that: produces entry enclosure temperature signal 228 and communicates entry enclosure temperature signal 228 to temperature-stabilized isothermal entry enclosure 211 of temperature-stabilized isothermal enclosure 208, wherein entry enclosure temperature signal 228 stably controls a temperature of temperature-stabilized isothermal entry enclosure 211; produces detector enclosure temperature signal 227 and communicates detector enclosure temperature signal 227 to temperature-stabilized isothermal detector enclosure 232 of temperature-stabilized isothermal enclosure 208, detector enclosure temperature signal 227 stably controls a temperature of temperature-stabilized isothermal entry enclosure 211 and makes temperature-stabilized isothermal detector enclosure 232 isothermal with temperature-stabilized isothermal entry enclosure 211; and produces detector temperature control signal 226 and communicates detector temperature control signal 226 to temperature-stabilized isothermal detector mount 233 of temperature-stabilized isothermal enclosure 208, detector temperature control signal 226 stably controls a temperature of temperature-stabilized isothermal detector mount 233 and makes temperature-stabilized isothermal detector mount 233 isothermal with temperature-stabilized isothermal detector enclosure 232.

In an embodiment, self-referenced ambient radiation thermometer 200 includes: chopper controller 223 in communication with optical chopper 206 and phase-sensitive detector 222 and that: produces chopper control signal 230 and communicates chopper control signal 230 to optical chopper 206, chopper control signal 230 controls a modulation frequency subjected to central radiation 216 by optical chopper 206; and produces modulation signal 229 and communicates modulation signal 229 to phase-sensitive detector 222, modulation signal 229 provides a modulation frequency to which phase-sensitive detector 222 is referenced in detecting detector temperature signal 225 from temperature stabilized detector 201.

In an embodiment, self-referenced ambient radiation thermometer 200 includes: phase-sensitive detector 222 in communication with chopper controller 223 and temperature stabilized detector 201 and that: receives modulation signal 229 from chopper controller 223 and detector temperature signal 225 from temperature stabilized detector 201; detects detector temperature signal 225 that is modulated at modulation frequency; and produces phase locked temperature signal 231 from which temperature of blackbody object 220 is determined.

In an embodiment, self-referenced ambient radiation thermometer 200 includes: analyzer 224 in communication with phase-sensitive detector 222 and that: receives phase locked temperature signal 231 from phase-sensitive detector 222; and determines temperature of blackbody object 220 from phase locked temperature signal 231. According to an embodiment, analyzer 224 determines temperature of blackbody object 220 according to:

$$v + D = \frac{A}{\exp\left(\frac{c_2}{B*T + C}\right) - 1}$$

wherein v is phase locked temperature signal 231; D is an additive-constant voltage; and A, B, and C are fitting parameters.

Figure 2:
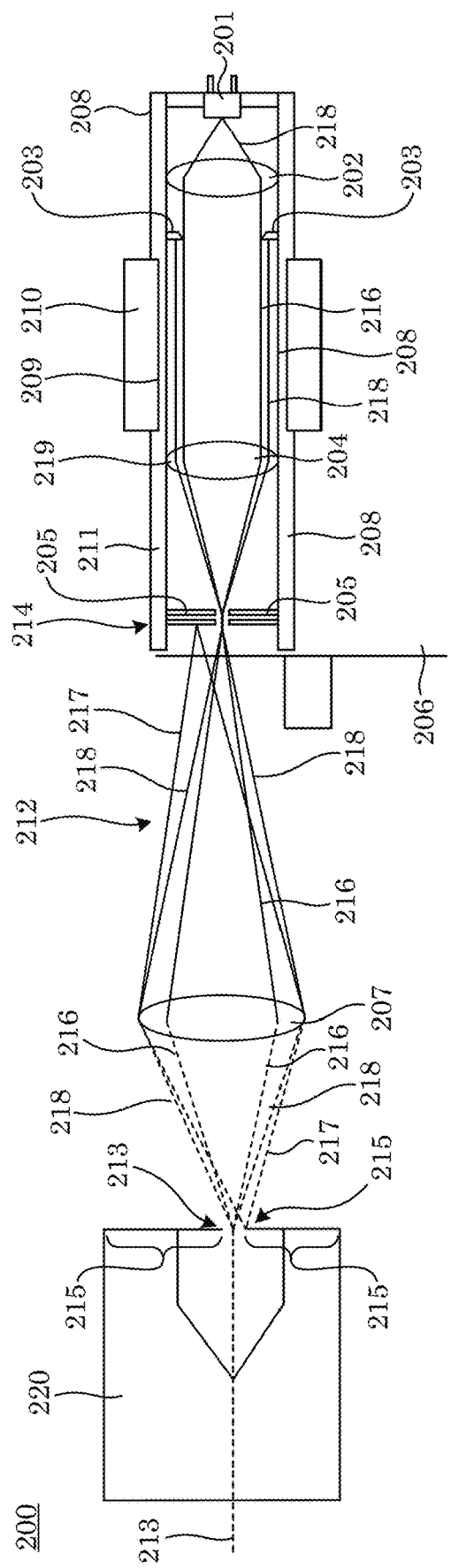
FIG. 2 shows a self-referenced ambient radiation thermometer (ART) for testing and calibrations that includes fluid-bath and heat-pipe blackbodies. A front aperture of a water-bath blackbody has an internal diameter of 108 mm restricted to a diameter of 25 mm. A Lyot stop prevents scattered radiation from an edge of a lens from being collected by a detector. A distance from a front surface of the blackbody to a front surface of ART is 40 cm.
Figure 3:
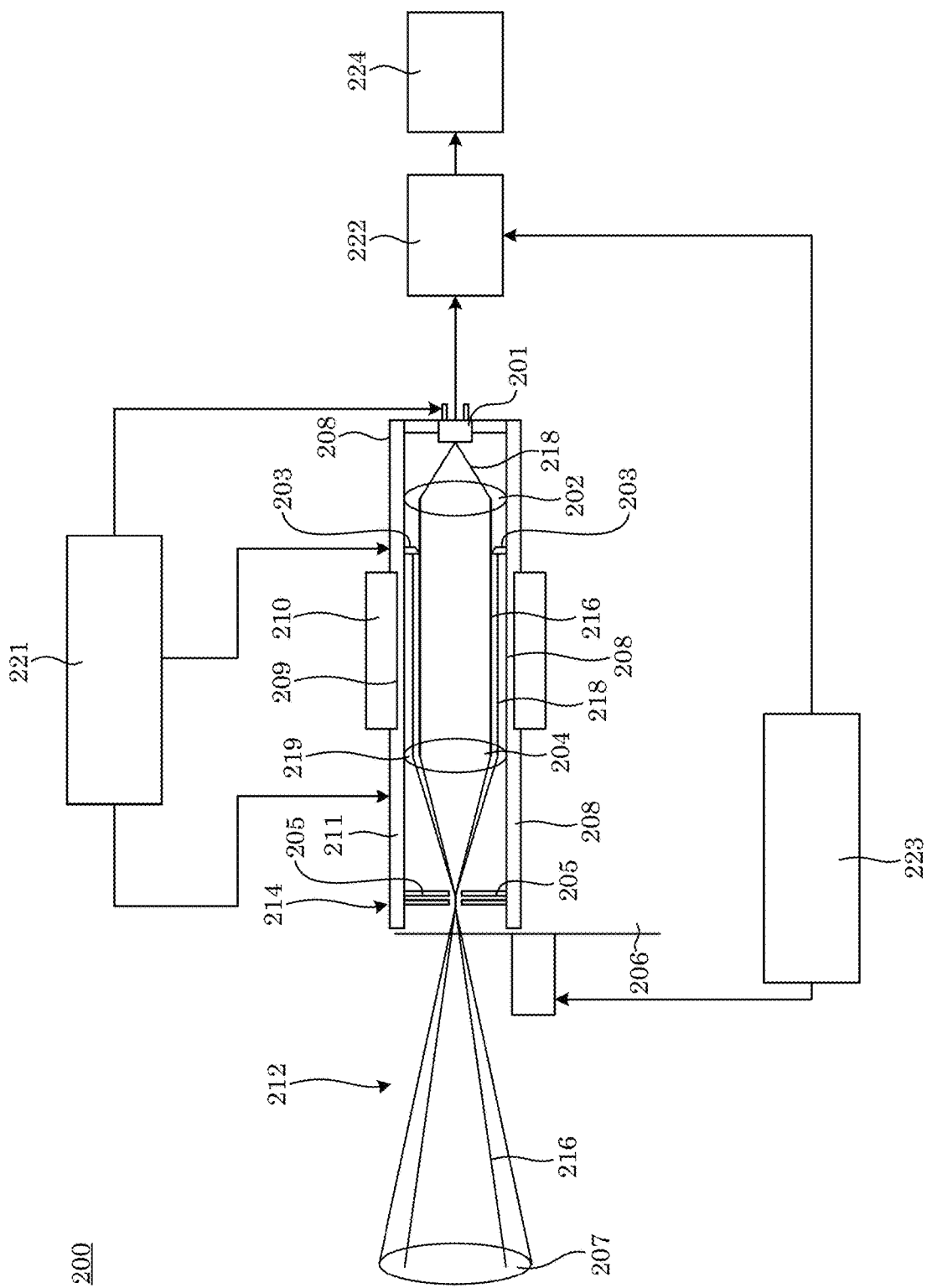
FIG. 3 shows a self-referenced ambient radiation thermometer.

It should be appreciated that in self-referenced ambient radiation thermometer 200, e.g., shown in FIG. 2, objective lens objective lens 207 focuses blackbody radiation 212, e.g., central radiation 216, from central radiation region 213 of blackbody object 220. Field stop 205 is disposed at objective lens image plane 214 of objective lens 207 and blocks certain parts of blackbody radiation 212, e.g., peripheral radiation 217, from blackbody object 220 that is in peripheral portion 215 and absent from central radiation region 213. Collimating lens 204 disposed in temperature-stabilized isothermal enclosure 208 collimates that communicates through field stop 205, and Lyot stop 203 blocks scattered radiation 218 from edge 219 of collimating lens 204. Detector lens 202 collects central radiation 216 onto temperature stabilized detector 201.

It should be appreciated that self-referenced ambient radiation thermometer 200 functions as a radiation thermometer apparatus to determine temperatures of objects from infrared radiation emitted by such object such as blackbody object 220.

Objective lens 207 or a mirror collects blackbody radiation 212 from blackbody object 220 and focuses blackbody radiation 212 on field stop 205. Objective lens 207 can be formed from infrared transmitting material. Mirrors in off-axis or on-axis geometry also can be used as objective lens 207. Exemplary infrared transmitting materials include ZnSe, Ge, CaF, sapphire, and the like. It is contemplated that a reflective optic with mirrors can be used as objective lens 207.

Temperature-stabilized isothermal enclosure 208 holds field stop 205, collimating lens 204, Lyot stop 203, detector lens 202, and temperature stabilized detector 201. Field stop 205, collimating lens 204, Lyot stop 203, detector lens 202, and temperature stabilized detector 201 are maintained at the same, constant temperature. A temperate of temperature-stabilized isothermal enclosure 208 is controlled, and a set point for the temperature of temperature-stabilized isothermal enclosure 208 is selected to reduce thermal gradients inside temperature-stabilized isothermal enclosure 208. Accordingly, temperature stabilization of temperature-stabilized isothermal enclosure 208 can be accomplished with a thermoelectric cooler such as those that function by Peltier effect. Such thermoelectric coolers can be controlled by temperature controller 221 via, e.g., entry enclosure temperature signal 228, detector enclosure temperature signal 227, or detector temperature control signal 226. Temperature stabilization can also be performed using a circulating fluid that is temperature-stabilized with a bath or a chiller. Sensing the temperature of temperature-stabilized isothermal enclosure 208 can be performed with a contact sensor such as a thermistor, platinum resistance thermometer or thermocouple. It is contemplated that a non-contact temperature measurement of temperature-stabilized isothermal enclosure 208 can be made by a pyrometer or another temperature-stabilized isothermal enclosure 208 that has been calibrated. Heatsinks can dissipate heat generated by thermoelectric coolers.

To detect thermal radiation, e.g., central radiation 216, temperature stabilized detector 201 can be a pyroelectric detector with a transmitting filter that can be, e.g., 8 µm to 14 µm. Wavelengths of transmission can be selected for a peak of Planck blackbody radiation from blackbody object 220 that can be at room temperature. Exemplary temperature stabilized detectors 201 include thermopiles, indium antimonide (InSb), or mercury cadmium telluride (MCT) detectors.

Since pyroelectrics detectors respond to changes in temperature, optical chopper 206 modulates the blackbody radiation 212 that includes central radiation 216. Optical modulation can be performed by optical chopper 206 that can include a rotary chopper wheel or electromagnetic, resonant chopper. To increase infrared reflectance and to reduce absorption of central radiation 216, a surface of a chopper blade of optical chopper 206 was covered with aluminum tape or foil. The blade of the chopper wheel or modulator of optical chopper 206 can be disposed proximate to field stop 205 to use a self-staring effect that reduces stray thermal radiation from outside of temperature-stabilized isothermal enclosure 208 entering temperature-stabilized isothermal enclosure 208. A highly reflecting surface may implicate temperature stabilized detector 201 detecting thermal background from temperature-stabilized isothermal enclosure 208 rather than environment external to temperature-stabilized isothermal enclosure 208.

Self-referenced ambient radiation thermometer 200 can be calibrated with a standard blackbody that can be disposed as blackbody object 220 having a temperature or spectral emissivity that is quantitatively known. The temperature of the standard blackbody can be determined using a standard platinum resistance thermometer (SPRT) that can be calibrated by an International Temperature Scale of 1990 (ITS-90) technique.

The modulated central radiation 216 communicated by optical chopper 206 and detected by temperature stabilized detector 201 that produces detector temperature signal 225 as a modulated signal is measured using phase-sensitive detection such as phase-sensitive detector 222 since detector temperature signal 225 can be low. That is, phase-sensitive detector 222 such as a lock-in amplifier measures phase-sensitive detector temperature signal 225. An x-axis amplitude can be positive when the temperature of blackbody object 220 is greater than the temperature of temperature-stabilized isothermal enclosure 208 and can be negative when the temperature of blackbody object 220 is less than the temperature of temperature-stabilized isothermal enclosure 208. Phase locked temperature signal 231 produced by phase-sensitive detector 222 locked to modulation signal 229 from chopper controller 223 is converted to the temperature of blackbody object 220 using a modified 3-parameter Planck interpolation function referred to as the Sakuma-Hattori equation. A 4th parameter can be added to convert negative phase locked temperature signal 231 to a positive signal. The fitted equation is inverted to covert signals, e.g., phase locked temperature signal 231, to the temperature of blackbody object 220 with analyzer 224 that can include instruction, e.g., a computer program, for the conversion.

Self-referenced ambient radiation thermometer 200 can be made in various ways. In an embodiment, a process for making self-referenced ambient radiation thermometer 200 includes disposing temperature stabilized detector 201 in optical communication with detector lens 202; optically interposing detector lens 202 between the temperature stabilized detector 201 and the blackbody object 220 such that central radiation 216 from the blackbody object 220 is focused on temperature stabilized detector 201; disposing Lyot stop 203 in optical communication with blackbody object 220 and optically interposing Lyot stop 203 between detector lens 202 and blackbody object 220 such that Lyot stop 203 receives scattered radiation 218 from collimating lens 204, stops scattered radiation 218 from reaching temperature stabilized detector 201, and communicates central radiation 216 to detector lens 202; disposing collimating lens 204 in optical communication with temperature stabilized detector 201 and optically interposing collimating lens 204 between temperature stabilized detector 201 and blackbody object 220 such that collimating lens 204 receives central radiation 216 from blackbody object 220 and collimates central radiation 216 to detector lens 202; disposing field stop 205 in optical communication with collimating lens 204 and interposing detector lens 202 between collimating lens 204 and blackbody object 220 such that detector lens 202 receives central radiation 216 and peripheral radiation 217 from blackbody object 220, stops peripheral radiation 217 from reaching collimating lens 204, and communicates central radiation 216 to collimating lens 204; disposing optical chopper 206 in optical communication with collimating lens 204 and interposing optical chopper 206 between collimating lens 204 and blackbody object 220 such that optical chopper 206 receives central radiation 216 and peripheral radiation 217 from blackbody object 220, stops peripheral radiation 217 from reaching collimating lens 204, modulates central radiation 216, and communicates central radiation 216 to collimating lens 204 such that central radiation 216 received by temperature stabilized detector 201 is modulated at the modulation frequency of optical chopper 206; disposing objective lens 207 in optical communication with blackbody object 220 and temperature stabilized detector 201, optically interposing objective lens 207 between blackbody object 220 and field stop 205 such that: objective lens 207 receives central radiation 216 from blackbody object 220 and communicates central radiation 216 to field stop 205; and disposing temperature stabilized detector 201, the detector lens 202, the collimating lens 204, the Lyot stop 203, and the field stop 205 in temperature-stabilized isothermal enclosure 208 such that temperature-stabilized isothermal enclosure 208 provides a stable temperature and isothermal environment to elements disposed in temperature-stabilized isothermal enclosure 208.

Self-referenced ambient radiation thermometer 200 has numerous advantageous and unexpected benefits and uses. In an embodiment, a process for determining the temperature of blackbody object 220 with self-referenced ambient radiation thermometer 200 includes: providing, by temperature-stabilized isothermal enclosure 208, the stable temperature and isothermal environment to elements disposed in temperature-stabilized isothermal enclosure 208; producing central radiation 216 in central radiation region 213 by blackbody object 220; producing peripheral radiation 217 in peripheral portion 215 by blackbody object 220; receiving central radiation 216 and peripheral radiation 217 from blackbody object 220 by objective lens 207; focusing central radiation 216 and peripheral radiation 217 to objective lens image plane 214 at field stop 205; producing, from central radiation 216, scattered radiation 218 by objective lens 207 at edge 219 of objective lens 207; focusing scattered radiation 218 to objective lens image plane 214 at field stop 205 by objective lens 207; modulating central radiation 216 by optical chopper 206 so that central radiation 216 received by temperature stabilized detector 201 is modulated by optical chopper 206; receiving peripheral radiation 217 by field stop 205, blocking peripheral radiation 217 from further propagation in temperature-stabilized isothermal enclosure 208 toward temperature stabilized detector 201 by field stop 205, and transmitting central radiation 216 and scattered radiation 218 to collimating lens 204 from field stop 205; receiving central radiation 216 and scattered radiation 218 by collimating lens 204 from field stop 205; collimating central radiation 216 and scattered radiation 218 by collimating lens 204; receiving central radiation 216 and scattered radiation 218 from collimating lens 204 by Lyot stop 203, blocking scattered radiation 218 from further propagation in temperature-stabilized isothermal enclosure 208 toward temperature stabilized detector 201 by Lyot stop 203, and transmitting central radiation 216 in absence of scattered radiation 218 to detector lens 202 from Lyot stop 203; receiving central radiation 216 from Lyot stop 203 by detector lens 202; focusing central radiation 216 to temperature stabilized detector 201 by central radiation 216; receiving temperature stabilized detector 201 from detector lens 202 by temperature stabilized detector 201; and producing detector temperature signal 225 by temperature stabilized detector 201 in response to receiving central radiation 216 from detector lens 202 to determine temperature of blackbody object 220.

In an embodiment, the process for determining the temperature of blackbody object 220 with self-referenced ambient radiation thermometer 200 also includes producing, by temperature controller 221, entry enclosure temperature signal 228; communicating entry enclosure temperature signal 228 to temperature-stabilized isothermal entry enclosure 211 of temperature-stabilized isothermal enclosure 208; stably controlling, by entry enclosure temperature signal 228, temperature of temperature-stabilized isothermal entry enclosure 211; producing, by temperature controller 221, detector enclosure temperature signal 227; communicating detector enclosure temperature signal 227 to temperature-stabilized isothermal detector enclosure 232 of temperature-stabilized isothermal enclosure 208; stably controlling, by detector enclosure temperature signal 227, temperature of temperature-stabilized isothermal entry enclosure 211; making, by detector enclosure temperature signal 227, temperature-stabilized isothermal detector enclosure 232 isothermal with temperature-stabilized isothermal entry enclosure 211; and producing, by temperature controller 221, detector temperature control signal 226; communicating detector temperature control signal 226 to temperature-stabilized isothermal detector mount 233 of temperature-stabilized isothermal enclosure 208; stably controlling, by detector temperature control signal 226, temperature of temperature-stabilized isothermal detector mount 233; and making, by detector temperature control signal 226, temperature-stabilized isothermal detector mount 233 isothermal with temperature-stabilized isothermal detector enclosure 232.

In an embodiment, the process for determining temperature of blackbody object 220 with self-referenced ambient radiation thermometer 200 includes producing, by chopper controller 223, chopper control signal 230; communicating chopper control signal 230 to optical chopper 206; controlling, by chopper control signal 230, modulation frequency subjected to central radiation 216 by optical chopper 206; producing, by chopper controller 223, modulation signal 229; communicating modulation signal 229 to phase-sensitive detector 222; wherein modulation signal 229 provides modulation frequency to which phase-sensitive detector 222 is referenced in detecting detector temperature signal 225 from temperature stabilized detector 201.

In an embodiment, the process for determining temperature of blackbody object 220 with self-referenced ambient radiation thermometer 200 includes receiving, by phase-sensitive detector 222, modulation signal 229 from chopper controller 223 and detector temperature signal 225 from temperature stabilized detector 201; detecting, by phase-sensitive detector 222, detector temperature signal 225 that is modulated at modulation frequency; and producing, by phase-sensitive detector 222, phase locked temperature signal 231 from which temperature of blackbody object 220 is determined.

In an embodiment, the process for determining temperature of blackbody object 220 with self-referenced ambient radiation thermometer 200 includes receiving, by analyzer 224, phase locked temperature signal 231 from phase-sensitive detector 222; and determining, by analyzer 224, temperature of blackbody object 220 from phase locked temperature signal 231.

In an embodiment, in the process for determining temperature of blackbody object 220 with self-referenced ambient radiation thermometer 200, the temperature of blackbody object 220 is determined according to:

$$v + D = \frac{A}{\exp\left(\frac{c_2}{B*T + C}\right) - 1}$$

wherein v is phase locked temperature signal 231; D is additive-constant voltage; and A, B, and C are fitting parameters.

The articles and processes herein are illustrated further by the following Example, which is non-limiting.

Example

A self-referenced ambient radiation thermometer for thermal-infrared radiation detection includes optical elements such as a field stop, Lyot stop, collimating lens, and detector disposed in a thermally stabilized assembly referred to as a temperature-stabilized isothermal enclosure that is thermally controlled to be at a constant temperature and provide an isothermal environment using thermo-electric coolers and thermistors. The self-referenced ambient radiation thermometer is calibrated using a variable-temperature fluid-bath and a heat-pipe blackbody from −45° C. to 75° C. and the use of a modified-Planck function with these blackbodies. The size-of-source effect both with and without the Lyot stop has been measured. The self-referenced ambient radiation thermometer operates without cryogenic cooling and provides sub millikelvin temperature measurement resolution with few millikelvin, week-long stable operations while measuring room-temperature objects.

Radiation thermometers operate in the 8 µm to 14 µm wavelength range to measure objects that are near or at room temperatures including human body temperature. These thermal-infrared radiation thermometers (TIRT) can be used non-contact diagnostics of equipment or assessments of food temperatures during transport and storage. Although TIRTs have been extensively utilized since the early 1960s, their optical designs have not evolved during this period. TIRTs can suffer poor long-term stabilities and large size-of-source effects (SSE). Some TIRTs have been characterized for SSE, but since their designs cannot be modified, it is difficult to determine the exact cause of the SSE. Furthermore, optical designs developed for improving visible and near-infrared radiation thermometers have not been implemented in the thermal infrared devices or have only been partially implemented in standards-quality radiation thermometers which use off-axis reflective optics.

The self-referenced ambient radiation thermometer herein, also referred to herein as Ambient-Radiation Thermometer (ART), implements SSE reduction designs of visible and near-infrared radiation thermometry. To increase long-term stability of responsivity, optical components within the field-of-view of the detector and the detector are thermally stabilized using three separate thermo-electric control setups. ART is constructed with zinc-selenide (ZnSe) lenses for collecting and focusing the thermal-infrared radiation onto the pyroelectric detector. The pyroelectric detector has a window with an 8 µm to 14 µm filter for spectral selection, and the detector and preamplifier are packaged into a hermetically sealed container. Due to the use of a pyroelectric detector, the radiation is modulated using a rotating chopper wheel, and the modulated signals are measured using a commercial lock-in amplifier. The SSE of the ART was measured, and the ART was calibrated using variable-temperature water-bath and a lower-temperature ammonia heat-pipe blackbody, and both short- and long-term stabilities were assessed using those blackbodies.

The optical design of the ART is shown in FIG. 1, and specifications of ART are listed in FIG. 4. Optical elements are selected for optimal operation in the 8 µm to 14 µm spectral range. The optical elements are placed on a small breadboard for quick changes to the design, and the setup is enclosed on all sides using anodized-aluminum sheets as light-tight covers. Plano-convex, anti-reflection coated ZnSe lenses are used for this on-axis optical setup. The 50 mm diameter ZnSe objective lens is placed at 40 cm from the blackbody opening to form a focused image at 25 cm from the center of the objective lens to the field stop. Both sides of the chopper wheel are covered with reflective, aluminum tape to reduce the emittance of the wheel, and the wheel is placed so that the blade completely covers the opening of the detector assembly when the blade is in the closed position. Due to the slow response time of the pyroelectric detector, the chopper wheel is operated at 4 Hz.

The design of the detector assembly, including field stop, two lenses, the Lyot stop and the detector itself, is included for low-noise, stable operation of ART. The approximately 30 cm-long anodized aluminum tube that contains the detector assembly is temperature stabilized to 23° C. using three separate thermo-electric (TE) coolers. The three coolers are attached to the sections with the field stop, the Lyot stop, and detector and denoted as the front, back, and detector assemblies, respectively. Separate coolers are used so that each section can be optically aligned and to avoid temperature gradients. The temperature sensing of the two sections and the detector are performed using three separate glass-encapsulated thermistors, and TE controllers are used to stabilize the assembly. As shown by the display on the TE controllers, the temperatures of the assemblies are stable to <1 ohm which corresponds to <2 mK at the set temperatures. The temperatures are set by letting all the sections equilibrate with the lab temperature and then decreasing the set point to 500 ohms below the equilibrium thermistor resistance. This corresponds to a setpoint of about 1° C. higher temperature than the laboratory temperature. The stabilization temperature is set to be just slightly above the lab temperatures so that convection effects can be minimized. The low-power temperature stabilization circuit can be operated for long periods of time without any operator intervention. Since the front and the back sections with the two lenses need to be separately aligned, the two sections are separated by a gap which is later covered with a thin anodized aluminum tubing and then insulated using commercial foam-pipe insulation.

Figure 5:
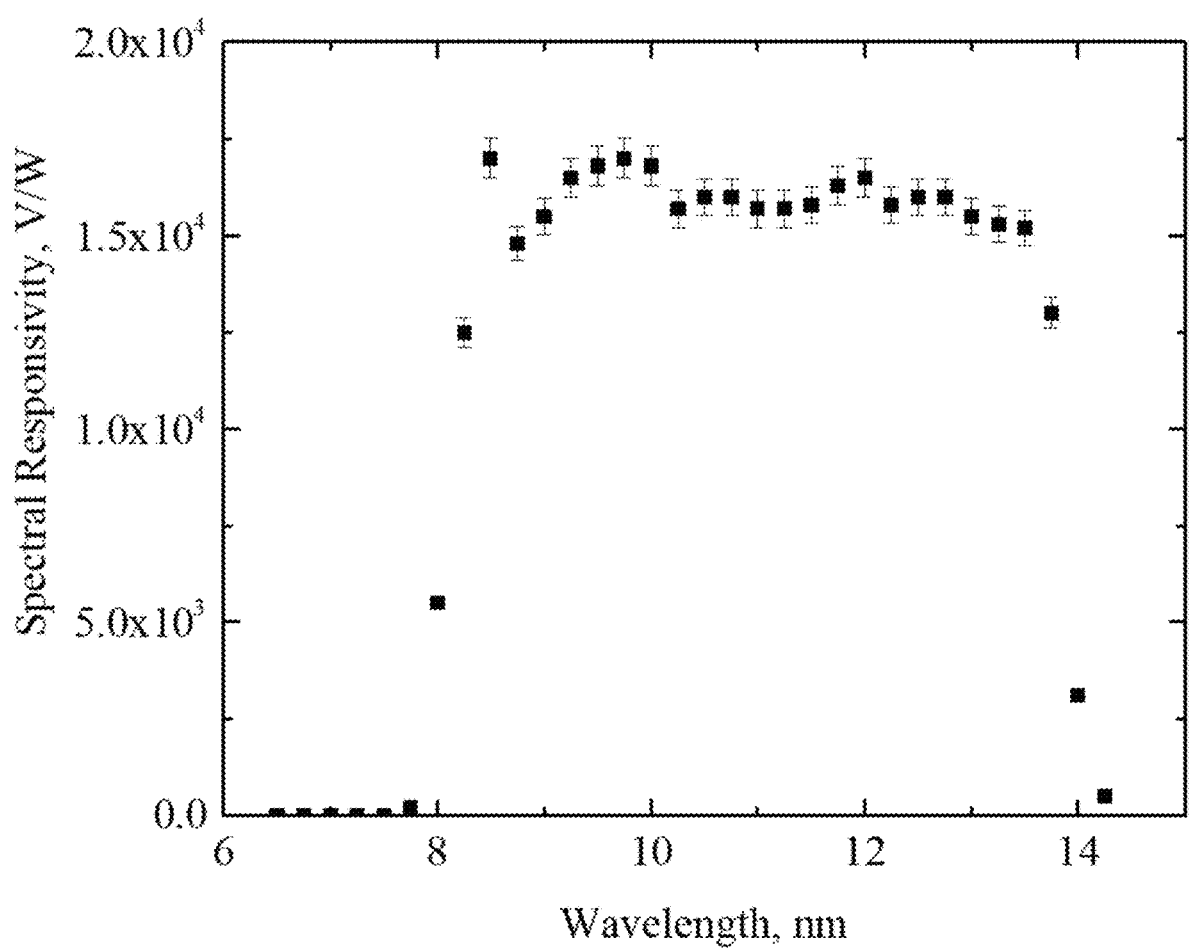
FIG. 5 shows spectral power responsivity of a pyroelectric detector package, wherein a preamplifier is integrated into a detector package, and a spectral filter is a detector window. Expanded uncertainties of responsivities of 3% are shown.

Detectors sensitive to radiation in the 8 µm to 14 µm wavelength range are classified as thermal devices such as thermopiles, pyroelectrics, and bolometers, or quantum devices such as HgCdTe detectors. The detector is stable and operational over extended periods of time without cryocooling. A pyroelectric detector was developed in conjunction to obtain high gains with low-noise performance. The current-to-voltage preamplifier with a 100 GΩ feedback resistor was integrated onto the detector into a single, electronic sealed package to obtain low noise levels. The spectral responsivity of the detector as measured in the NIST Infrared Spectral Comparator Facility (IR-SCF) is shown in FIG. 5. The spectral responsivity is flat with a standard deviation of about 4% over the spectral region of interest from 8.5 µm to 13.5 µm.

From the calibrated spectral power responsivity, the noise-equivalent power (NEP) was determined so that comparisons to other detectors could be performed. As shown in FIG. 6, the NEP is dependent on the filter time constant setting on the lock-in amplifier. The noise-equivalent power of the chopped radiation is given by the NEP divided by the square root of the chopping frequency, and detectivities are obtained from multiplying by the square root of the area of the detector. These performance metrics are commonly used to compare detectors that can vary in detection wavelengths and active areas. The detectivity of our detector is roughly a factor of two higher than other commonly available pyroelectric detectors.

Optical performance of ART was assessed using an optical-modeling program. The specifications of the plano-convex ZnSe objective lens were input into the program, and the optimal focus distance from the back edge of the lens was determined using the program to find the minimum root-mean-squared-spot size at the wavelength of interest. Optimized distances were calculated at both visible wavelength of 550 nm and at 10 µm, and the distance offsets were used to guide the physical alignment of ART. The field stop was aligned using visible radiation and then moved by the offset distance calculated using the optical modeling software. Strehl ratios shown in FIG. 7 are measures of the image quality and indicate that the ZnSe lens material is not optimally suited for collection of broad-band thermal radiation from 8 μm to 14 μm. It was calculated at the optimized wavelength of 11 μm and at the short and long wavelengths of the filter transmittances. The image quality rapidly degrades due to chromatic aberrations of the ZnSe lens, and the image quality is nearly diffraction limited only at the optimization wavelength. In retrospect, the use of Germanium lenses would have been more suitable.

The schematic of ART and the water-bath and heat-pipe blackbodies used for these studies is shown in FIG. 2. These blackbody measurements were performed in the NIST Advanced infrared radiometry and imaging facility (AIRI), and ART was calibrated using the standard platinum resistance thermometers in both water-bath (WBBB) and ammonia heat-pipe blackbodies (AHPBB)[7]. The water-bath blackbody can be operated from 15° C. to 75° C. The NIST design has been extensively studied, and similar blackbodies have been constructed for laboratory and portable uses. At lower temperatures from −46° C. to 20° C., an ammonia heat-pipe blackbody, with temperature control provided by an external, ethanol-bath circulator was used to calibrate ART. The distance from the opening of the blackbody to the front surface of the lens is set at 40 cm.

Figure 8:
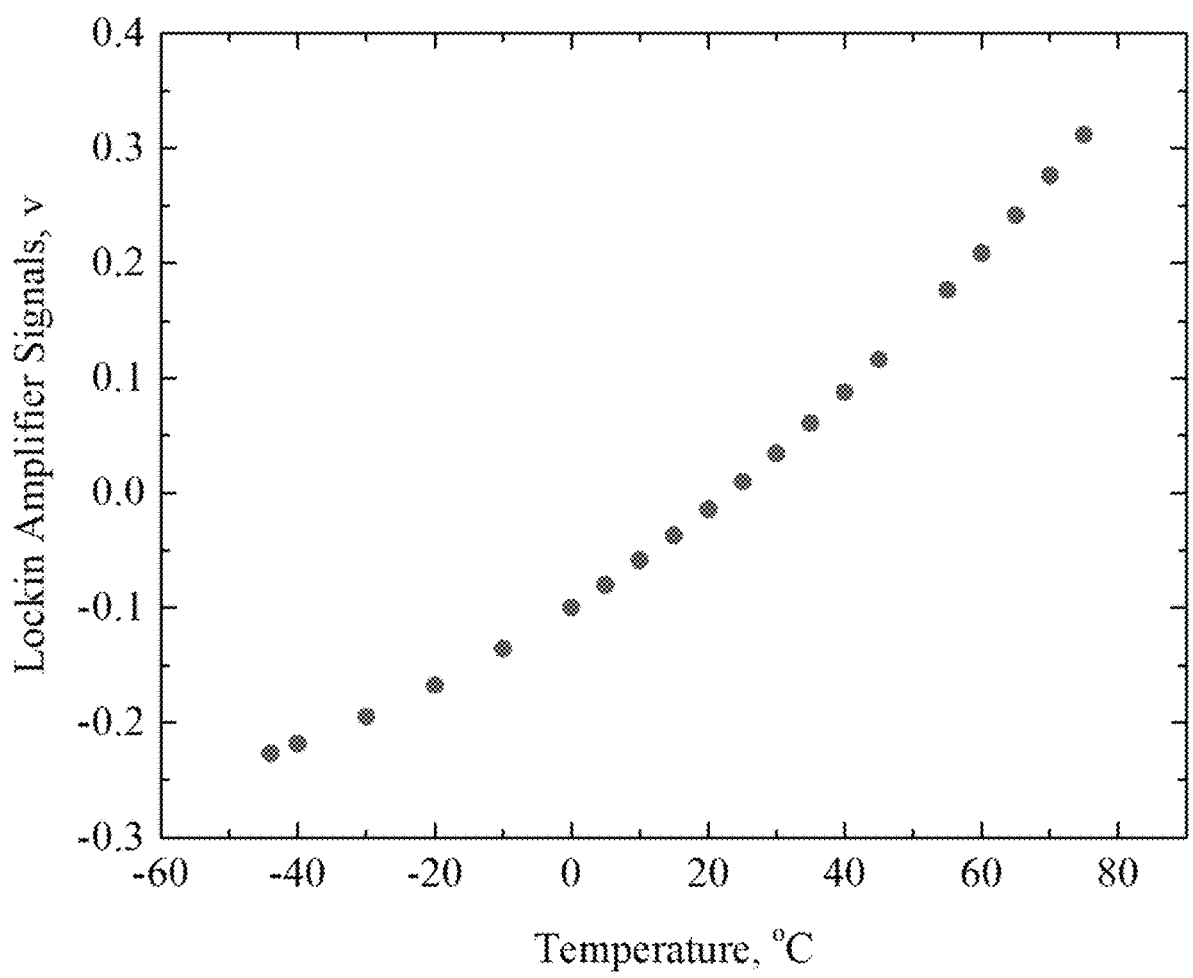
FIG. 8 shows measured lock-in amplifier signals as a function of SPRT temperatures. X-amplitude signals from lock-in measurements are plotted. A change in sign of signals occurs where a blackbody temperature is equal to a reference, optical-assembly temperature.

The temperatures of the fluid in the water bath and the ammonia heat pipe were measured using calibrated standard platinum resistance thermometers (SPRT), and these known temperatures are used to convert the optical signals from the ART to temperatures. For these initial measurements, no corrections were made for the spectral emissivity of the respective cavities, and the emissivities were assigned to be unity. For these initial measurements, we estimated the uncertainties. The interpolation function to convert signals shown in FIG. 8 to temperatures is obtained using two steps.

To fit the signals with an interpolation function, negative signals are converted to positive signals to have a singular, positive dependence on absolute temperature, K. An additive-constant voltage, D, is determined by minimizing the differences between the measured signals and scaled band-integrated Planck integrals at the measured temperatures where T1 is chosen to be 298 K or 25° C., S(λ) is the spectral responsivity plotted in FIG. 5 and L(λ,T) is the Planck function, $$\chi^2 = \sum \left( (v(T) + D) - v(T_1) \frac{\int S(\lambda) * L(\lambda, T)}{\int S(\lambda) * L(\lambda, T_1)} \right)^2. \quad (1)$$

This step is performed to decrease the residuals between the interpolation function and their measured data points, and because the commercial fitting software could not converge on the optimized values with sufficiently small residuals The measured lock-in amplifier voltages, v, at various temperatures are fitted using a modified-Planck function, $$v + D = \frac{A}{\exp\left(\frac{c_2}{B*T+C}\right) - 1}, \quad (2)$$

where T is temperature in kelvin, c2 is the second radiation constant, and A, B, and C are fitting parameters, and parameter D is obtained from Eq. (1).

Figure 9:
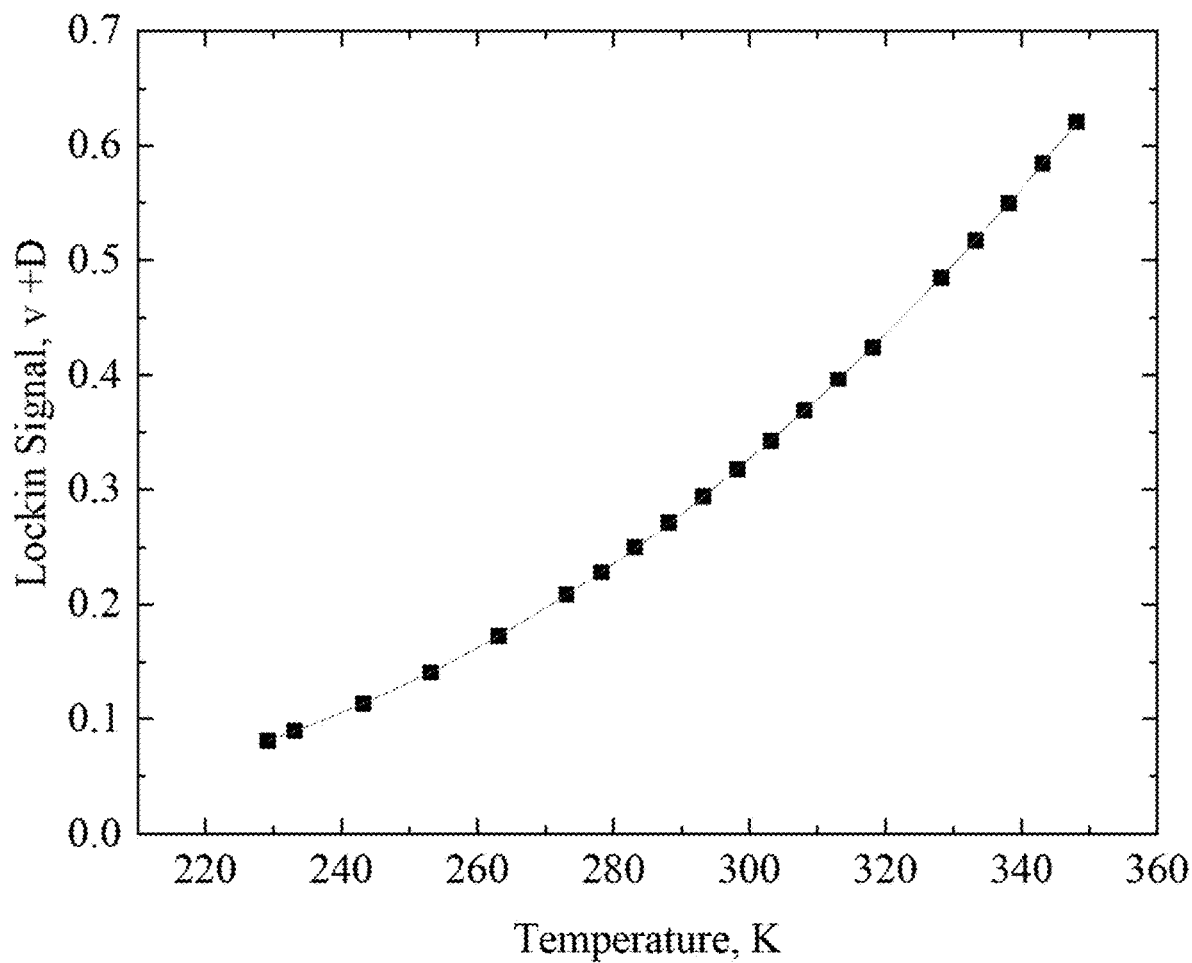
FIG. 9 shows an interpolation fitting of lock-in signals with a constant offset D with the Sakuma-Hattori function. The fitting was performed in two sections for the respective blackbodies and resulted in lower residuals compared to a single global fit.
Figure 10:
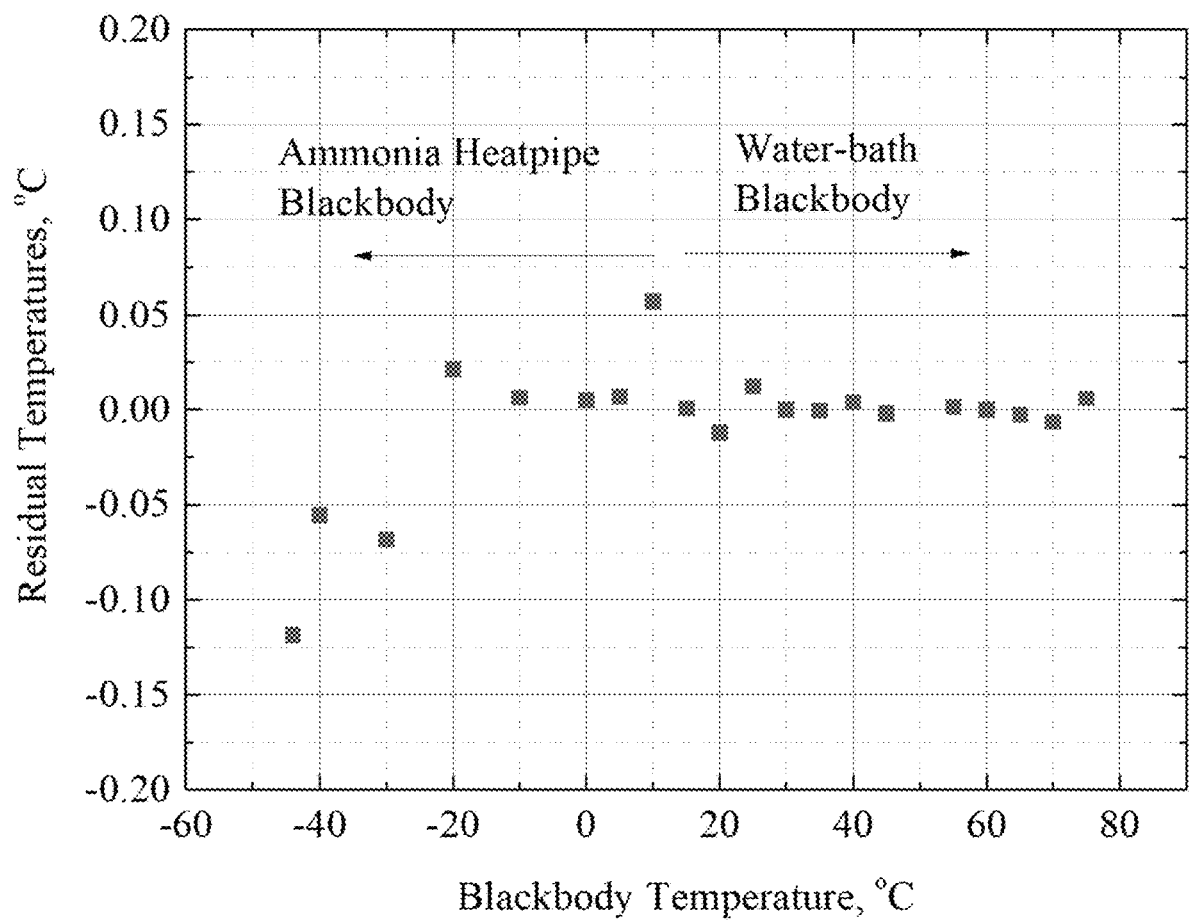
FIG. 10 shows residual temperatures from a fitting. Residuals from a temperature range where water-bath blackbody was used are smaller than a range where an ammonia heat-pipe blackbody was used.

The differences in temperatures from the fit or residual temperature from FIG. 9 are shown in FIG. 10. In the range where the WBBB was used for the calibrations, the residuals are below 10 mK from 20° C. to 75° C.

Figure 11:
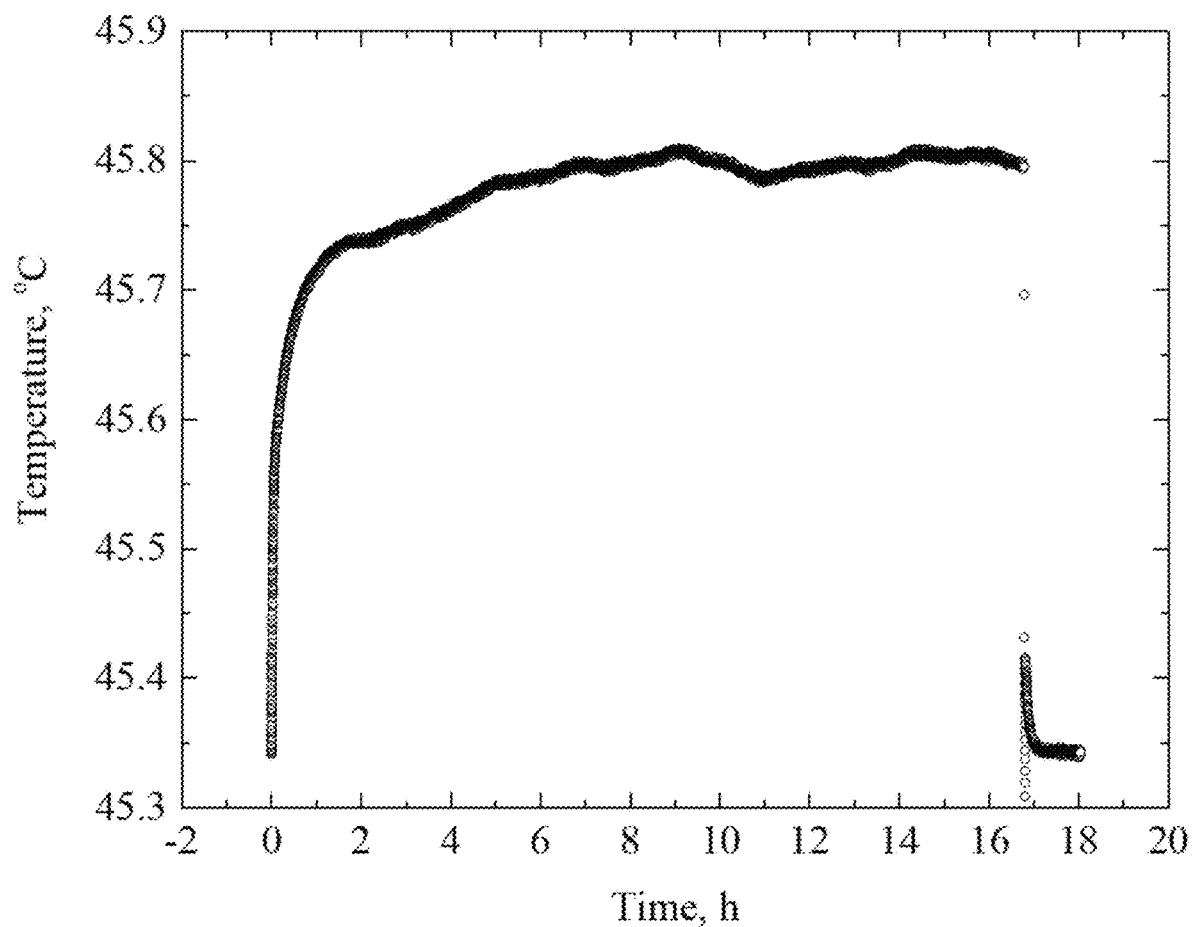
FIG. 11 shows non-contact temperature measurements of a water-bath blackbody initially measured to be at 45.342° C. using ART. A temperature-stabilization circuit was off at a beginning of measurements and on past a 16-hour mark. An increase in temperature is due to decrease in temperature of an uncontrolled, optical assembly. After thermo-electric coolers control temperature of the assembly, measured temperature returns to an initial value to within 2 mK.

Conventional thermal infrared devices and radiation thermometers can have poor long-term stability due to sensitivity of the detector to the thermal radiation from the constantly changing ambient background and changing device temperatures. Unlike detectors that operate in the visible radiation range, detectors that are sensitive to thermal radiation cannot be shielded from ambient sources unless they are placed in cryogenically cooled, vacuum environments. Thus, the challenge in working with thermal detectors is to stabilize the thermal background radiation and yet have the detector be sensitive to the relevant sources of thermal radiation. The effectiveness of the temperature-stabilized assembly shown in FIG. 1 can be seen in FIG. 11. For these measurements, the ART was used to measure the radiation from the water-bath blackbody, which was set at a nominal temperature of 45° C. and controlled to an uncertainty of <2 mK over the entire time interval. For these measurements, the initial temperature using ART was found to be 45.342° C. The temperature-stabilization circuit, which was on prior to these measurements, was turned off at the initial start of the measurements shown in FIG. 11, and the optical assembly was allowed to equilibrate to the varying ambient temperature of the laboratory, which was about 1.0° C. to 0.5° C. lower than the assembly temperature. Due to the poor thermal coupling between the optical assembly and the surroundings, the temperatures measured by ART increases slowly in about an hour to 0.5° C. higher than the initial temperatures. Without the feed-back temperature implemented, ART measured temperatures change by about 100 mK during this 15-hour interval. The rapid response of ART to the stabilization circuit being turned on is shown at the 16 h mark. The measured temperatures return to the initial values to within 2 mK.

Figure 12:
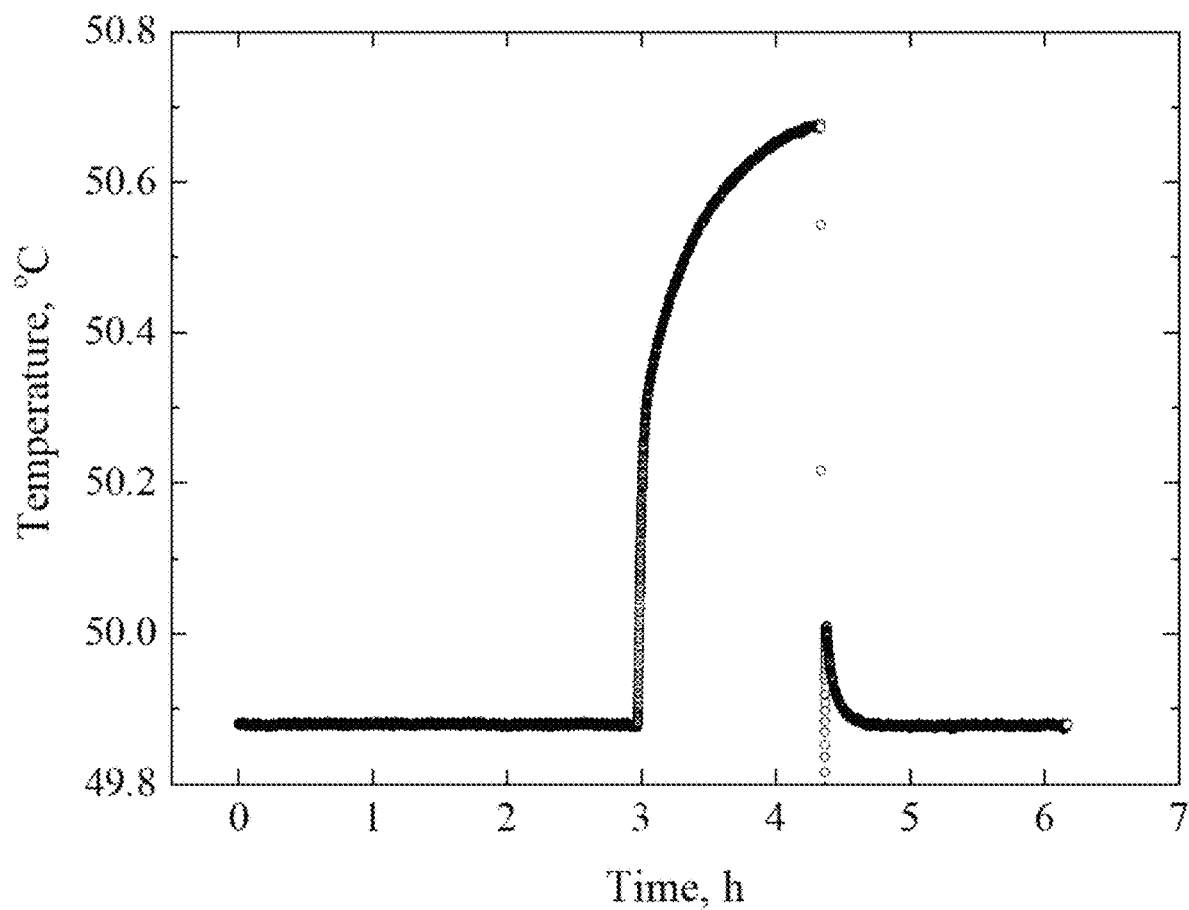
FIG. 12 shows data for when a temperature stabilization circuit was off at 3 hours after start, and the radiometer was allowed to drift. The stabilization circuit was turned on after 4 hours, and signals returned to initial values within 30 min.

Measurements were performed to determine the time constant for the thermal stabilization circuit to bring ART to equilibrium conditions. In FIG. 12, the thermal stabilization was turned off at the 3 h mark and turned back on at the 4 h mark. The measured temperatures came back to <5 mK within 30 min of the resumption of the stabilization loop.

Figure 13:
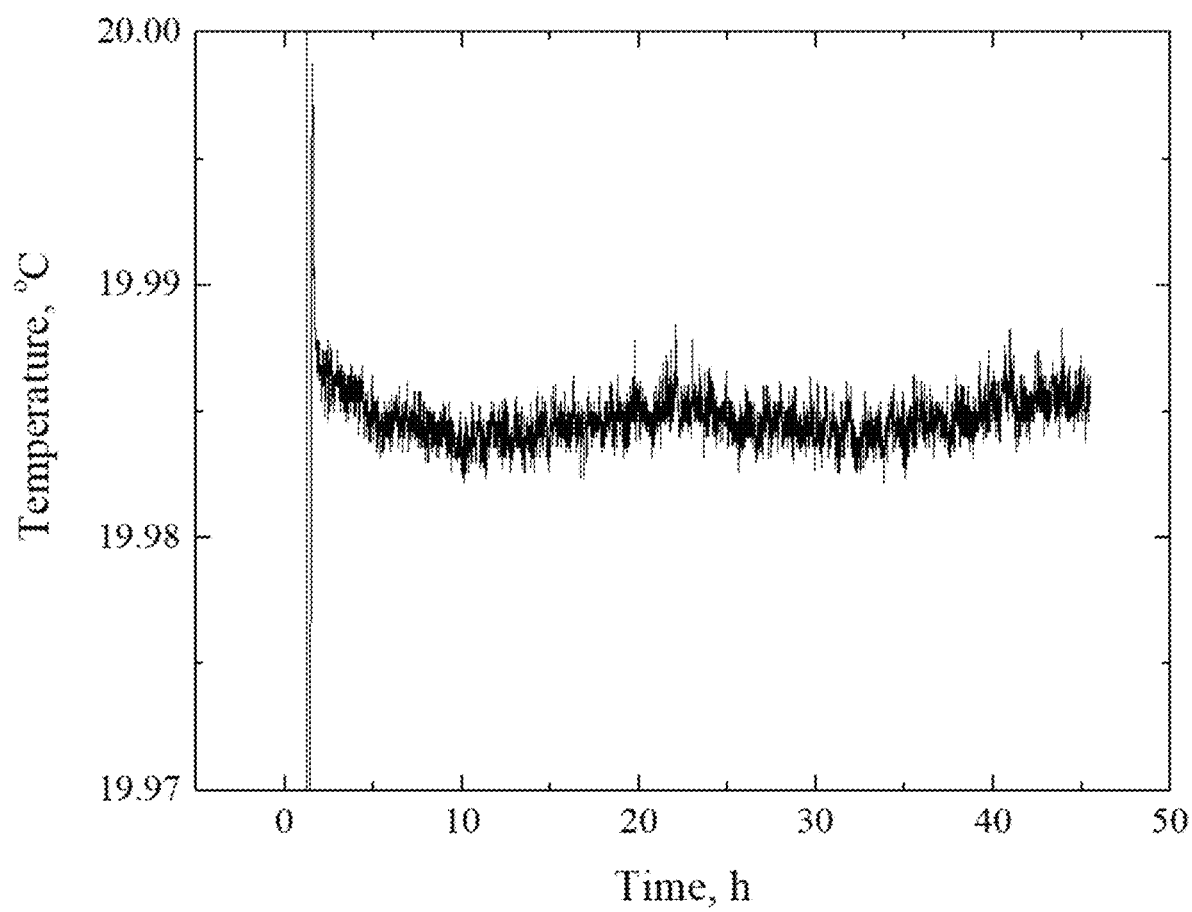
FIG. 13 shows 48 h measurements of WBBB set at 20° C. An offset in ART measured temperatures from WBBB temperature is due to differences in calibration. ART measured temperatures are stable to <3 mK over an entire interval of 48 h.

Long-term measurements were also performed to test ART stabilization circuit as shown in FIG. 13. The WBBB was set at 20° C., and ART was used to perform measurements over a 48-h interval. Using a contact thermometer, the WBBB has been determined to be stable to <1 mK over this interval due to the large volume of fluid (42 l) in the reservoir. Non-contact, ART temperatures were found to be stable to <3 mK for 48 h. The laboratory temperature was not stabilized and could have been changing by a few degrees Celsius over 2 days of measurements. The outside chassis of ART is not temperature stabilized and was allowed to drift with the environmental temperatures. The stability of ART directly results from the thermal stability of the detector compartment shown in FIG. 1.

Figure 14:
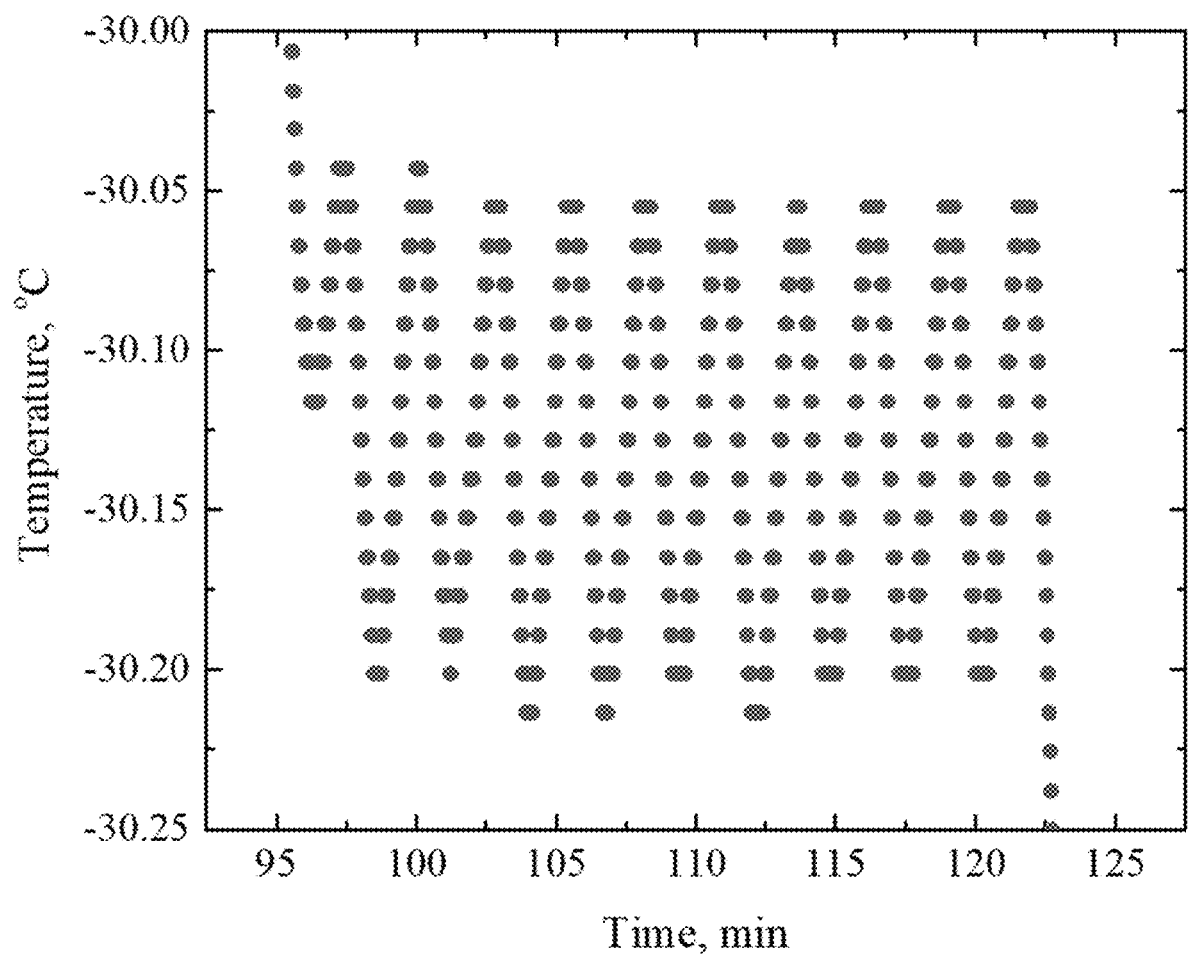
FIG. 14 shows ART measurements of AHPBB set at −30° C. Oscillations are from a control loop algorithm did not fully stabilize AHPBB temperatures. Digitization of about 10 mK is from the resolution of lock-in amplifier signals. A noise-equivalent temperature of ART at these temperatures is estimated to be about 3 mK based on the comparisons to the SPRT measurements.

ART measured sources whose temperatures are lower than 20° C. FIG. 14 shows measurements of AHPBB set at a temperature of −30° C. AHPBB is cooled using a recirculating ethanol bath whose temperature is set from a contact sensor on AHPBB. Chilled ethanol is circulated into AHPBB using insulating hoses which are about 2 m in length. The oscillations are from the bath and are results of the control algorithm which could not be optimized further. ART temperatures are digitized to about 10 mK due to the resolution limit of the lock-in amplifier.

Figure 15:
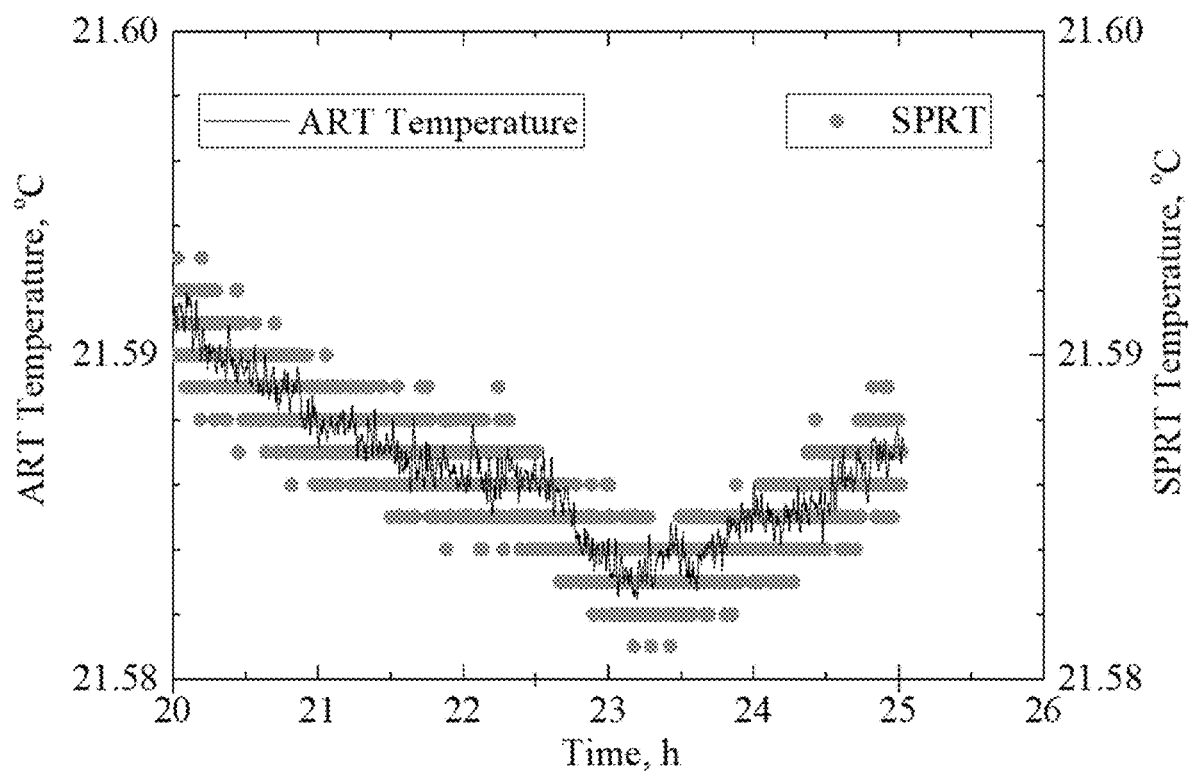
FIG. 15 shows comparison of ART non-contact temperature measurements with SPRT contact temperatures. SPRT temperatures have a resolution of 1 mK due to limitation of a readout instrument. The ART noise floor is <1 mK.
Figure 16:
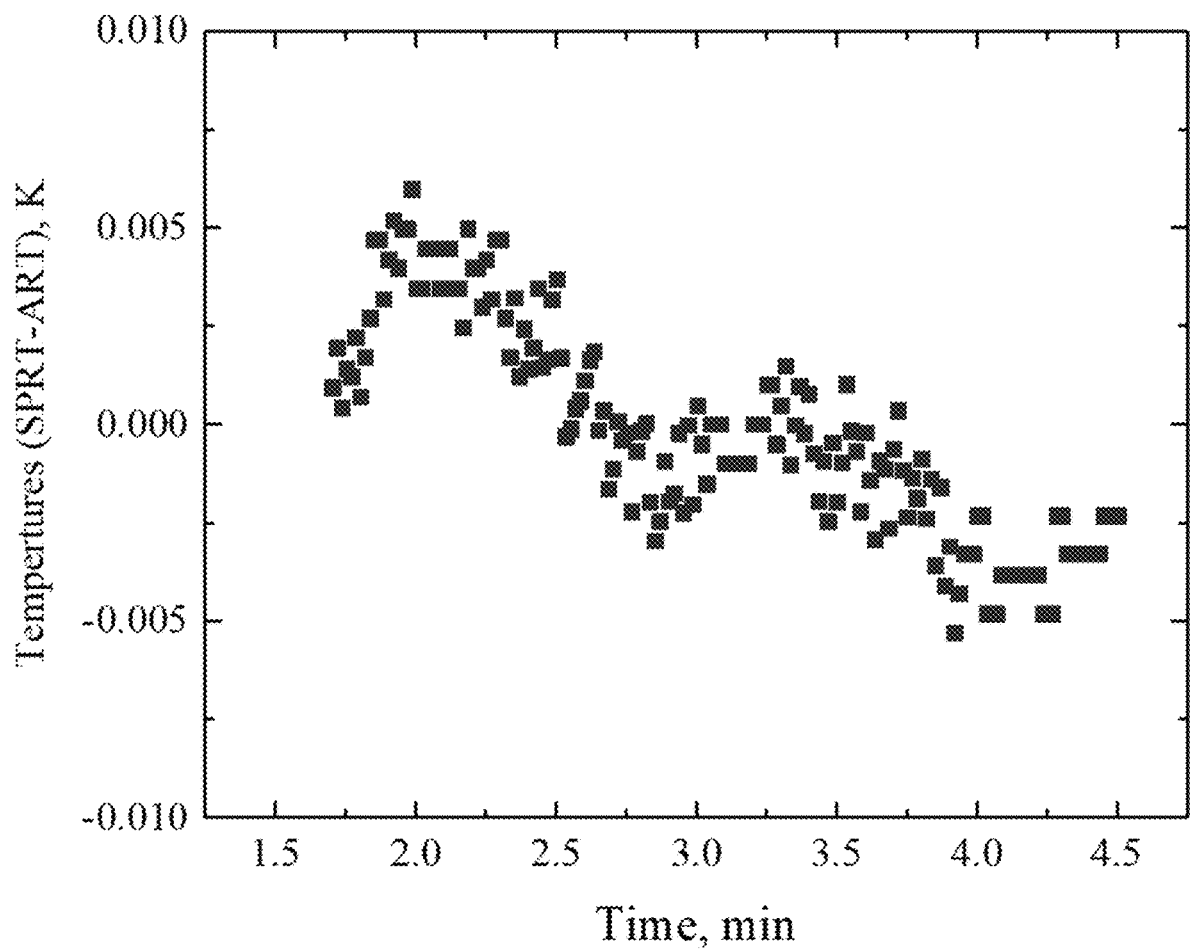
FIG. 16 shows noise-equivalent temperature differences of the ART at −30° C. as measured using differences of the SPRT-ART temperatures.

A metric of radiation thermometers is noise-equivalent temperature difference or NETD. NETD of ART is difficult to assess due to many factors. Since ART measures in the thermal infrared, a long-term stable source that is capable of low-noise operations and insensitive to the temperature fluctuations from the environment is needed. For the measurements shown in FIG. 15, AHPBB was allowed to drift at room temperature without the recirculating ethanol bath, and its temperature measured using the imbedded SPRT. The large heat capacity of the heat pipe and The deep blackbody cavity result in a stable source that slowly drifts over time. AHPBB temperatures are also set close to the internal reference temperature of ART so that the signal differences of the reference and measurement sources are small. In FIG. 15, SPRT temperatures are digitized at 1 mK due to the resolution of the readout device. ART NETD is estimated to be <1 mK at 22° C. ART tracks SPRT temperatures over the 5 h of measurements shown in FIG. 15. NETD at lower than ambient temperatures are more difficult to assess due to the oscillations of the AHPBB. The NETD was assessed by differences of the SPRT and ART temperatures over a time interval where both measurements were smoothly, monotonically varying. The NETD based upon these measurements is found to be about 3 mK at −30° C. as determined from the width or the peak-to-valley of the differences shown in FIG. 16. The measurement of NETD was performed in region where the effect of the quantization of ART temperatures is reduced.

Figure 17:
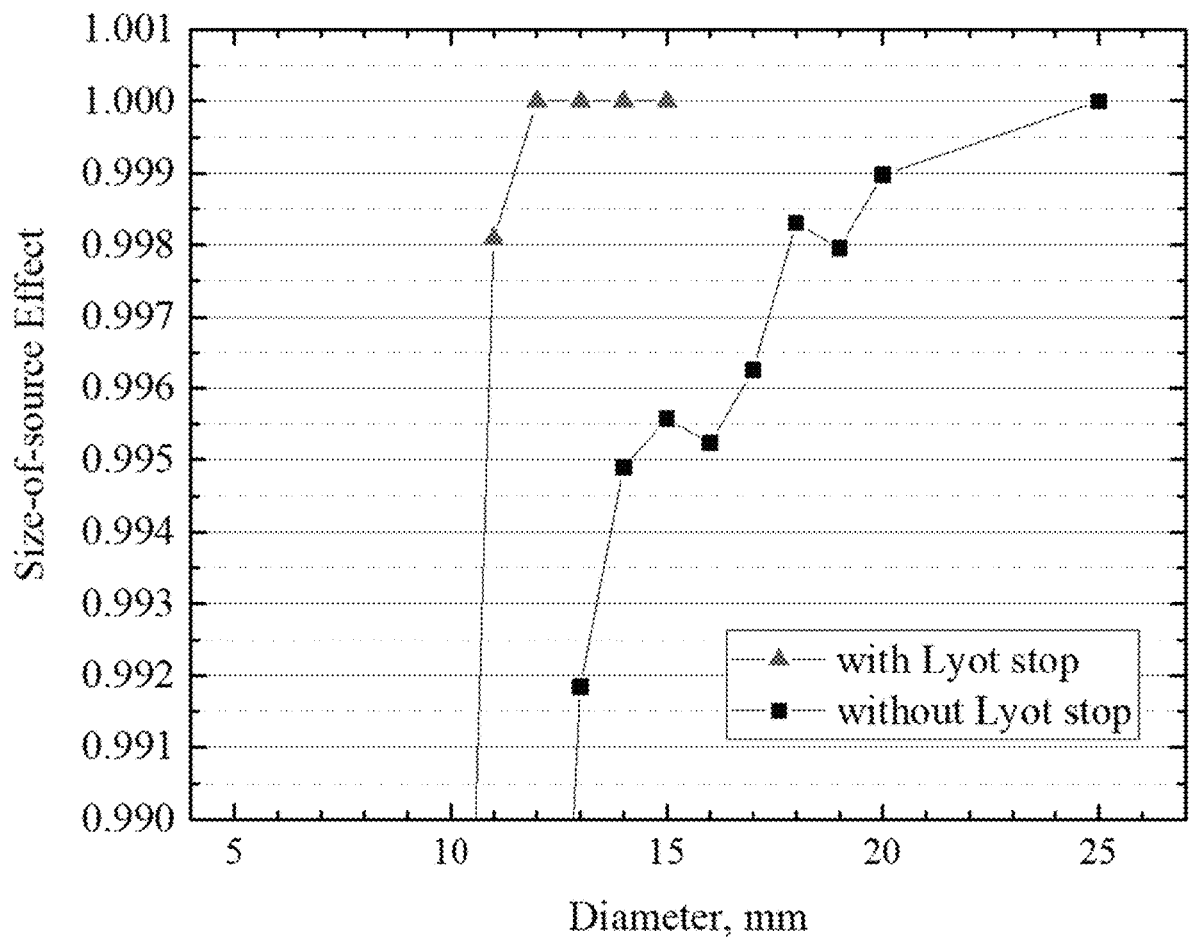
FIG. 17 shows a size-of-source effect measured using ART. SSE for the configuration with a Lyot stop is not detected beyond 12 mm. Absence of a Lyot stop results in increased SSE with additional structure.

Size-of-source effect (SSE) was determined for ART using a flat-plate variable-temperature blackbody (FPBB) with a source diameter of 152.4 mm. A circular, metallic, variable-aperture iris was used to vary the source diameter, and SSE was measured using the direct method. FPBB was set at a constant temperature of 55° C. for these measurements and to avoid emissivity changes with varying iris diameters, FPBB was set at 20 degrees from perpendicular to avoid inter-reflections that could lead to a change in FPBB emissivity. It was found that FPBB aligned perpendicular to the optical axis of ART resulted in an increase in the measured signals as the iris diameters were decreased. This increase in signal can be explained due to the increase in FPBB emissivity from 0.95 to a higher value from the inter-reflections of the infrared radiation within the iris. The effectiveness of the Lyot stop in suppressing SSE can be observed in FIG. 17. With the detector placed directly at the field-stop location, SSE is not suppressed and shows additional structure due to scatter from optical elements and the chassis. SSE is measured using the direct method $$SSE = \frac{V(d)}{V(ref)}, \quad (3)$$

where the signals, measured at diameters, d, are ratioed to the signal measured at the reference diameter of 15 mm and 25 mm respectively for the optical configurations with and without Lyot stops.

A partial estimate of the standard and expanded uncertainties of the ART non-contact temperature measurement is given in FIG. 18. The traceability of the temperature measurements comes from the standard, platinum-resistance thermometer. The uncertainty value for the SPRT temperatures was obtained from manufacturer specifications. The WBBB emissivity is calculated to be 0.99997 when the opening is reduced to 50 mm diameter. Due to the depth of the respective WBBB and AHPBB cavities, the temperature differences between the SPRT and the cavity bottom and the non-uniformity of the cavity temperature are combined into the first term in the uncertainty budget. The uncertainty of the residuals of the fitted interpolation function is obtained from FIG. 10. The reproducibility of the ART temperatures is obtained from FIG. 13. The total uncertainties of the ART are only about a factor of 2 greater than that of industrial-grade standard platinum resistance thermometers. The uncertainty due to the chopper-surface temperature instability is reduced due to the coating of the surface of the chopper with a low-emittance aluminum foil tape. The long-term stable measurements shown in FIG. 13 or FIG. 15 involves a chopper surface temperature varying less than 1 mK. This is an incomplete estimate since we do not have long-term, month-long reproducibility measurements for this design, and furthermore uncertainties have not been assessed at the entire temperature range of the ART operations from −46° C. to 75° C.

A thermally stabilized optical design for an infrared radiation thermometer has been constructed and characterized using variable-temperature blackbodies. The temperature stabilization of the field stop, collimating lens, Lyot stop, focusing lens, and detector within a common enclosure at a temperature close to ambient enables long-term stable operation of the radiation thermometer. Pyroelectric detectors are operated using modulated signals since they respond to changes in the signal rather than steady state signal, and any changes in the background signal will lead to changes in the modulated signals. The chopper wheel was covered with reflective aluminum tape to reduce the infrared emittance to low levels so that the detector will just measure the thermal radiation from the temperature-stabilized assembly shown in FIG. 1. The long-term stability of the calibration depends on the reproducibility of the detector response as well as the stability of the thermistors used for feed-back stabilization using the thermo-electric coolers. The few millikelvin stability of the ART measurements over days is attributed to the repeatability of these components. Since the reproducibility of thermistors over time has been well demonstrated, it is now possible to develop radiation thermometers which can be stable to few millikelvins over extended periods of time, such as months, and are easily transportable and deployable.

The self-referenced ambient radiation thermometer can be a standards-quality radiation thermometer to validate non-contact temperature scales at calibration laboratories. Incorporation of these design principles provide a field-level radiation thermometer for assessing sea- and land-surface temperatures and can be included in non-dispersive infrared (NDIR) gas sensors that operate in the mid- and long-infrared regions. Moreover, self-referenced ambient radiation thermometer can be used as a thermal imager.

While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix (s)

as used herein is intended to include both the singular and the plural of the term that it modifies, thereby including at least one of that term (e.g., the colorant(s) includes at least one colorants). Optional or optionally means that the subsequently described event or circumstance can or cannot occur, and that the description includes instances where the event occurs and instances where it does not. As used herein, combination is inclusive of blends, mixtures, alloys, reaction products, and the like.

As used herein, a combination thereof refers to a combination comprising at least one of the named constituents, components, compounds, or elements, optionally together with one or more of the same class of constituents, components, compounds, or elements.

All references are incorporated herein by reference.

The use of the terms a and an and the and similar referents in the context of describing the invention (especially in the context of the following claims) are to be construed to cover both the singular and the plural, unless otherwise indicated herein or clearly contradicted by context. Or means and/or. It can further be noted that the terms first, second, primary, secondary, and the like herein do not denote any order, quantity, or importance, but rather are used to distinguish one element from another. The modifier about used in connection with a quantity is inclusive of the stated value and has the meaning dictated by the context (e.g., it includes the degree of error associated with measurement of the quantity). The conjunction or is used to link objects of a list or alternatives and is not disjunctive; rather the elements can be used separately or can be combined under appropriate circumstances.

What is claimed is:

1. A self-referenced ambient radiation thermometer for determining a temperature of a blackbody object, the self-referenced ambient radiation thermometer comprising:
    a temperature stabilized detector that receives central radiation from a blackbody object and produces a detector temperature signal in response to receipt of the central radiation;
    a detector lens in optical communication with the temperature stabilized detector and optically interposed between the temperature stabilized detector and the blackbody object and that receives the central radiation from the blackbody object and focuses the central radiation on the temperature stabilized detector;
    a Lyot stop in optical communication with the blackbody object and optically interposed between the detector lens and the blackbody object and that receives scattered radiation from a collimating lens, stops the scattered radiation from reaching the temperature stabilized detector, and communicates the central radiation to the detector lens;
    the collimating lens in optical communication with the temperature stabilized detector and optically interposed between the temperature stabilized detector and the blackbody object and that receives the central radiation from the blackbody object and collimates the central radiation to the detector lens;
    a field stop in optical communication with the collimating lens and interposed between the collimating lens and the blackbody object and that receives the central radiation and peripheral radiation from the blackbody object, stops the peripheral radiation from reaching the collimating lens, and communicates the central radiation to the collimating lens;
    an optical chopper in optical communication with the collimating lens and interposed between the collimating lens and the blackbody object and that receives the central radiation and peripheral radiation from the blackbody object, stops the peripheral radiation from reaching the collimating lens, modulates the central radiation, and communicates the central radiation to the collimating lens such that the central radiation received by the temperature stabilized detector is modulated at a modulation frequency of the optical chopper;
    an objective lens in optical communication with the blackbody object and the temperature stabilized detector, optically interposed between the blackbody object and the field stop and that: receives the central radiation from the blackbody object and communicates the central radiation to the field stop; and
    a temperature-stabilized isothermal enclosure that provides a stable temperature and isothermal environment to elements disposed in the temperature-stabilized isothermal enclosure, wherein the elements disposed in the temperature-stabilized isothermal enclosure comprise: the temperature stabilized detector, the detector lens, the collimating lens, the Lyot stop, and the field stop.

2. The self-referenced ambient radiation thermometer of claim 1, further comprising the blackbody object.

3. The self-referenced ambient radiation thermometer of claim 1, wherein the field stop is disposed at an objective lens image plane of the objective lens.

4. The self-referenced ambient radiation thermometer of claim 1, further comprising a temperature stabilizing thermal insulation disposed on the temperature-stabilized isothermal enclosure to thermally insulate the temperature-stabilized isothermal enclosure and the elements disposed in the temperature-stabilized isothermal enclosure.

5. The self-referenced ambient radiation thermometer of claim 1, wherein the temperature-stabilized isothermal enclosure comprises:
    a temperature-stabilized isothermal entry enclosure in which the field stop and the collimating lens are disposed;
    a temperature-stabilized isothermal detector enclosure in which the Lyot stop and the detector lens are disposed;
    a temperature-stabilized isothermal transition region that separates the temperature stabilized detector and the Lyot stop from the field stop; and
    a temperature-stabilized isothermal detector mount on which the temperature stabilized detector is disposed.

6. The self-referenced ambient radiation thermometer of claim 1, wherein the objective lens comprises an edge that receives the central radiation and produces the scattered radiation that is blocked by the Lyot stop.

7. The self-referenced ambient radiation thermometer of claim 1, further comprising:
    a temperature controller in communication with the temperature-stabilized isothermal enclosure and that:
    produces an entry enclosure temperature signal and communicates the entry enclosure temperature signal to a temperature-stabilized isothermal entry enclosure of the temperature-stabilized isothermal enclosure, wherein the entry enclosure temperature signal stably controls a temperature of the temperature-stabilized isothermal entry enclosure;
    produces a detector enclosure temperature signal and communicates the detector enclosure temperature signal to a temperature-stabilized isothermal detector enclosure of the temperature-stabilized isothermal enclosure, the detector enclosure temperature signal stably controls a temperature of the temperature-stabilized isothermal entry enclosure and makes temperature-stabilized isothermal detector enclosure isothermal with temperature-stabilized isothermal entry enclosure; and produces a detector temperature control signal and communicates the detector temperature control signal to a temperature-stabilized isothermal detector mount of the temperature-stabilized isothermal enclosure, the detector temperature control signal stably controls a temperature of the temperature-stabilized isothermal detector mount and makes temperature-stabilized isothermal detector mount isothermal with temperature-stabilized isothermal detector enclosure.

8. The self-referenced ambient radiation thermometer of claim 1, further comprising:

a chopper controller in communication with the optical chopper and a phase-sensitive detector and that:

produces a chopper control signal and communicates the chopper control signal to the optical chopper, the chopper control signal controls a modulation frequency subjected to the central radiation by the optical chopper; and produces a modulation signal and communicates the modulation signal to a phase-sensitive detector, the modulation signal provides a modulation frequency to which the phase-sensitive detector is referenced in detecting the detector temperature signal from the temperature stabilized detector.

9. The self-referenced ambient radiation thermometer of claim 8, further comprising:

the phase-sensitive detector in communication with the chopper controller and the temperature stabilized detector and that:

receives the modulation signal from the chopper controller and the detector temperature signal from the temperature stabilized detector;

detects the detector temperature signal that is modulated at the modulation frequency; and produces a phase locked temperature signal from which the temperature of the blackbody object is determined.

10. The self-referenced ambient radiation thermometer of claim 9, further comprising:

an analyzer in communication with the phase-sensitive detector and that:

receives the phase locked temperature signal from the phase-sensitive detector; and determines the temperature of the blackbody object from the phase locked temperature signal.

11. The self-referenced ambient radiation thermometer of claim 10, wherein the analyzer determines the temperature of the blackbody object according to:

$$v + D = \frac{A}{\exp\left(\frac{c_2}{B*T+C}\right) - 1}$$

wherein v is the phase locked temperature signal; D is an additive-constant voltage; and A, B, and C are fitting parameters.

12. A process for determining a temperature of a blackbody object with the self-referenced ambient radiation thermometer of claim 1, the process comprising:

providing, by the temperature-stabilized isothermal enclosure, the stable temperature and isothermal environment to elements disposed in the temperature-stabilized isothermal enclosure;

producing central radiation in a central radiation region by the blackbody object;

producing peripheral radiation in a peripheral portion by the blackbody object;

receiving the central radiation and the peripheral radiation from the blackbody object by the objective lens;

focusing the central radiation and the peripheral radiation to an objective lens image plane at the field stop;

producing, from the central radiation, scattered radiation by the objective lens at an edge of the objective lens;

focusing the scattered radiation to the objective lens image plane at the field stop by the objective lens;

modulating the central radiation by the optical chopper so that the central radiation received by the temperature stabilized detector is modulated by the optical chopper;

receiving the peripheral radiation by the field stop, blocking the peripheral radiation from further propagation in the temperature-stabilized isothermal enclosure toward the temperature stabilized detector by the field stop, and transmitting the central radiation and the scattered radiation to the collimating lens from the field stop;

receiving the central radiation and the scattered radiation by the collimating lens from the field stop;

collimating the central radiation and the scattered radiation by the collimating lens;

receiving the central radiation and the scattered radiation from the collimating lens by the Lyot stop, blocking the scattered radiation from further propagation in the temperature-stabilized isothermal enclosure toward the temperature stabilized detector by the Lyot stop, and transmitting the central radiation in an absence of the scattered radiation to the detector lens from the Lyot stop;

receiving the central radiation from the Lyot stop by the detector lens;

focusing the central radiation to the temperature stabilized detector by the central radiation;

receiving the temperature stabilized detector from the detector lens by the temperature stabilized detector; and producing the detector temperature signal by the temperature stabilized detector in response to receiving the central radiation from the detector lens to determine the temperature of a blackbody object.

13. The process of claim 12, further comprising: producing, by a temperature controller, an entry enclosure temperature signal; communicating the entry enclosure temperature signal to a temperature-stabilized isothermal entry enclosure of the temperature-stabilized isothermal enclosure; stably controlling, by the entry enclosure temperature signal, a temperature of the temperature-stabilized isothermal entry enclosure; producing, by the temperature controller, a detector enclosure temperature signal; communicating the detector enclosure temperature signal to a temperature-stabilized isothermal detector enclosure of the temperature-stabilized isothermal enclosure; stably controlling, by the detector enclosure temperature signal, a temperature of the temperature-stabilized isothermal entry enclosure; making, by the detector enclosure temperature signal, the temperature-stabilized isothermal detector enclosure isothermal with the temperature-stabilized isothermal entry enclosure; and producing, by the temperature controller, a detector temperature control signal; communicating the detector temperature control signal to a temperature-stabilized isothermal detector mount of the temperature-stabilized isothermal enclosure; stably controlling, by the detector temperature control signal, a temperature of the temperature-stabilized isothermal detector mount; and making, by the detector temperature control signal, the temperature-stabilized isothermal detector mount isothermal with the temperature-stabilized isothermal detector enclosure.

14. The process of claim 13, further comprising: producing, by a chopper controller, a chopper control signal; communicating the chopper control signal to the optical chopper; controlling, by the chopper control signal, a modulation frequency subjected to the central radiation by the optical chopper; producing, by the chopper controller, a modulation signal; communicating the modulation signal to a phase-sensitive detector; wherein the modulation signal provides a modulation frequency to which the phase-sensitive detector is referenced in detecting the detector temperature signal from the temperature stabilized detector.

15. The process of claim 14, further comprising: receiving, by the phase-sensitive detector, the modulation signal from the chopper controller and the detector temperature signal from the temperature stabilized detector; detecting, by the phase-sensitive detector, the detector temperature signal that is modulated at the modulation frequency; and producing, by the phase-sensitive detector, a phase locked temperature signal from which the temperature of the blackbody object is determined.

16. The process of claim 15, further comprising: receiving, by an analyzer, the phase locked temperature signal from the phase-sensitive detector; and determining, by the analyzer, the temperature of the blackbody object from the phase locked temperature signal.

17. The process of claim 16, wherein the temperature of the blackbody object is determined according to:

$$v + D = \frac{A}{\exp\left(\frac{c_2}{B*T+C}\right) - 1}$$

wherein v is the phase locked temperature signal; D is an additive-constant voltage; and A, B, and C are fitting parameters.

* * * * *